United States Patent
Kawajiri et al.

(10) Patent No.: US 9,160,020 B2
(45) Date of Patent: Oct. 13, 2015

(54) FUEL CELL

(75) Inventors: Kousuke Kawajiri, Aichi-ken (JP);
Keiji Hashimoto, Aichi-ken (JP);
Satoshi Futami, Aichi-ken (JP);
Takamasa Kanie, Aichi-ken (JP);
Kazunari Moteki, Aichi-ken (JP);
Tomokazu Hayashi, Aichi-ken (JP)

(73) Assignees: Toyota Shatai Kabushiki Kaisha (JP);
Toyota Jidosha Kabushiki Kiasha (JP)

( * ) Notice: Subject to any disclaimer, the term of this patent is extended or adjusted under 35 U.S.C. 154(b) by 0 days.

(21) Appl. No.: 13/259,495

(22) PCT Filed: Jan. 19, 2010

(86) PCT No.: PCT/JP2010/050562
§ 371 (c)(1),
(2), (4) Date: Sep. 23, 2011

(87) PCT Pub. No.: WO2010/113534
PCT Pub. Date: Oct. 7, 2010

(65) Prior Publication Data
US 2012/0028139 A1  Feb. 2, 2012

(30) Foreign Application Priority Data
Mar. 31, 2009 (JP) .................................. 2009-056646

(51) Int. Cl.
H01M 8/06 (2006.01)
H01M 8/02 (2006.01)
(Continued)

(52) U.S. Cl.
CPC ............ H01M 8/1004 (2013.01); H01M 4/926 (2013.01); H01M 8/021 (2013.01);
(Continued)

(58) Field of Classification Search
CPC ... H01M 8/06; H01M 8/0202; H01M 8/0258; H01M 8/026; H01M 8/0263; H01M 8/0265; H01M 8/10; H01M 8/02
USPC .......... 429/512–516, 129–147, 247–255, 414
See application file for complete search history.

(56) References Cited

U.S. PATENT DOCUMENTS 4,396,689 A * 8/1983 Grimes et al. ................. 429/105
4,649,091 A * 3/1987 McElroy ....................... 429/434
(Continued)

FOREIGN PATENT DOCUMENTS

JP 63-086361 A 4/1988
JP 07-153473 A 6/1995
(Continued)

OTHER PUBLICATIONS

"International Application Serial No. PCT/JP2010/050562, International Search Report mailed Apr. 27, 2010", (w/ English Translation), 4 pgs.

(Continued)

*Primary Examiner* — Patrick Ryan
*Assistant Examiner* — Kiran Quraishi
(74) *Attorney, Agent, or Firm* — Schwegman Lundberg & Woessner, P.A.

(57) ABSTRACT

An electrode structure 15 is received in a joint portion of frames 13, 14. A first gas diffusion layer 19 and a first gas passage forming member 21 are arranged on a first surface of the electrode structure 15. A second gas diffusion layer 20 and a second gas passage forming member 22 are formed on a second surface of the electrode structure 15. A separator 23 is joined with a surface of the frame 13 and a surface of the gas passage forming member 21. A separator 24 is joined with a surface of the frame 14 and a surface of the gas passage forming member 22. A water passage 28 is formed between a flat plate 25 of the gas passage forming member 22 and the separator 24. The water passage 28 has a depth set to a value smaller than depth of a gas passage T2 of the gas passage forming member 22. Generated water is introduced from the gas passage T2 of the gas passage forming member 22 to the water passage 28 through capillary action via communication holes 29. The generated water in the water passage 28 is moved to a downstream side of the water passage 28 by pressure caused by oxidization gas. This prevents corrosion of the cathode side electrode catalyst layer and improves durability of the anode side gas passage forming member. As a result, a fuel cell capable of preventing decrease of power generation is provided.

29 Claims, 15 Drawing Sheets

(51) Int. Cl.
*H01M 8/10* (2006.01)
*H01M 4/92* (2006.01)
*H01M 8/04* (2006.01)

(52) U.S. Cl.
CPC ............ *H01M 8/023* (2013.01); *H01M 8/026* (2013.01); *H01M 8/0267* (2013.01); *H01M 8/04126* (2013.01); *H01M 8/04156* (2013.01); *H01M 2008/1095* (2013.01); *Y02E 60/521* (2013.01)

(56) References Cited

U.S. PATENT DOCUMENTS

| | | | | |
|---|---|---|---|---|
| 4,983,472 | A | * | 1/1991 | Katz et al. ............ 429/514 |
| 5,998,058 | A | | 12/1999 | Fredley |
| 6,117,580 | A | * | 9/2000 | Nitschke et al. ............ 429/464 |
| 6,492,045 | B1 | * | 12/2002 | Blanchet et al. ............ 429/456 |
| 8,034,510 | B2 | | 10/2011 | Moteki et al. |
| 2004/0040696 | A1 | | 3/2004 | Cho et al. |
| 2005/0214626 | A1 | * | 9/2005 | Ohma ............ 429/38 |
| 2008/0131745 | A1 | * | 6/2008 | Ikeda et al. ............ 429/22 |
| 2009/0089989 | A1 | | 4/2009 | Hashimoto et al. |
| 2009/0155665 | A1 | | 6/2009 | Hashimoto |
| 2009/0239120 | A1 | * | 9/2009 | Moteki ............ 429/30 |
| 2010/0055530 | A1 | | 3/2010 | Kawajiri et al. |
| 2010/0151359 | A1 | | 6/2010 | Tanaka et al. |
| 2010/0285395 | A1 | | 11/2010 | Hayashi et al. |
| 2011/0159399 | A1 | | 6/2011 | Kondo |

FOREIGN PATENT DOCUMENTS

| | | | |
|---|---|---|---|
| JP | 08-138692 A | | 5/1996 |
| JP | 08-138701 A | | 5/1996 |
| JP | 2002-513200 A | | 5/2002 |
| JP | 2004-077120 A | | 3/2004 |
| JP | 2005-158670 A | | 6/2005 |
| JP | 2006-269160 A | | 10/2006 |
| JP | 2007-027055 A | | 2/2007 |
| JP | 2007-087768 A | | 4/2007 |
| JP | 2007-214020 A | | 8/2007 |
| JP | 2007-294339 A | | 11/2007 |
| JP | 2008-062269 A | | 3/2008 |
| JP | 2008-108573 A | | 5/2008 |
| JP | 2008-117786 A | | 5/2008 |
| JP | 2008-218304 A | | 9/2008 |
| JP | 2008-287955 A | | 11/2008 |
| JP | 2009-021022 A | | 1/2009 |
| JP | 2009-064688 A | | 3/2009 |
| JP | 2009-129892 A | | 6/2009 |
| JP | 2009-208124 A | | 9/2009 |
| JP | 2010-135268 A | | 6/2010 |
| JP | 2010-153040 A | | 7/2010 |
| JP | 2010-153041 A | | 7/2010 |
| JP | 2010-170984 A | | 8/2010 |
| JP | 2011-048980 A | | 3/2011 |
| JP | 2011-150801 A | | 8/2011 |
| JP | 2011-165559 A | | 8/2011 |
| JP | 2012-226914 A | | 11/2012 |
| WO | WO2008/050215 | * 5/2008 | ............ H01M 8/02 |
| WO | WO-2012144385 A1 | | 10/2012 |

OTHER PUBLICATIONS

"International Application Serial No. PCT/JP2010/050562, International Preliminary Report on Patentability issued Nov. 15, 2011", (w/ English Translation of Written Opinion), 10 pgs.

* cited by examiner

FUEL CELL

This application is a nationalization under 35 U.S.C. 371 of PCT/JP2010/050562, filed Jan. 19, 2010 and published as WO 2010/113534 A1 on Oct. 7, 2010, which claims priority to PCT application No. PCT/JP2009/056646, filed Mar. 31, 2009; which applications and publication are incorporated herein by reference in their entirety.

FIELD OF THE INVENTION

The present invention relates to a fuel cell mounted in, for example, an electric vehicle.

BACKGROUND OF THE INVENTION

A typical fuel cell includes a cell stack configured by a number of power generation cells, which are stacked together. A conventional power generation cell will hereafter be described with reference to FIGS. 23 to 25. As illustrated in FIG. 23, an electrode structure 15 is mounted in a joint portion between a pair of frames 13, 14. The electrode structure 15 is configured by a solid electrolyte membrane 16, an anode-side electrode catalyst layer 17, and a cathode-side electrode catalyst layer 18. The outer periphery of the solid electrolyte membrane 16 is clamped between the frames 13, 14. The anode-side electrode catalyst layer 17 is stacked on the top surface of the electrolyte membrane 16. The cathode-side electrode catalyst layer 18 is laid on the bottom surface of the electrolyte membrane 16. An anode-side gas diffusion layer 19 is laid on the top surface of the electrode catalyst layer 17. A cathode-side gas diffusion layer 20 is laid on the bottom surface of the electrode catalyst layer 18. An anode-side gas passage forming member 21 is laid on the top surface of the gas diffusion layer 19. A cathode-side gas passage forming member 22 is formed on the bottom surface of the gas diffusion layer 20.

As illustrated in FIG. 24, the gas passage forming member 21 (22) is formed by a metal lath. In the metal lath, a number of hexagonal ring portions 21a (22a) are formed in a serpentine manner. A through hole 21b (22b) is formed in each of the ring portions 21a (22a). Fuel gas (oxidization gas) flows in a gas passage formed by the ring portions 21a (22a) and the through holes 21b (22b). FIG. 25 is an enlarged view showing a portion of the gas passage forming member 21, 22.

With reference to FIG. 23, a fuel gas supply passage M1 and a fuel gas discharging passage M2 are formed in the frames 13, 14. The fuel gas supply passage M1 is a passage through which hydrogen gas as fuel gas is supplied to a gas passage in the anode-side gas passage forming member 21. The fuel gas discharging passage M2 is a passage through which the fuel gas that has passed through the gas passage of the gas passage forming member 21, which is fuel off-gas, is discharged to the exterior. An oxidization gas supply passage and an oxidization gas discharging passage are formed in the frames 13, 14. The oxidization gas supply passage is located at the backside of the sheet as viewed in FIG. 23. The oxidization gas supply passage is a passage through which the air as oxidization gas is supplied to a gas passage in the cathode-side gas passage forming member 22. The oxidization gas discharging passage is located at the front side of the sheet as viewed in FIG. 23. The oxidization gas discharging passage is a passage through which the oxidization gas that has passed through the gas passage of the gas passage forming member 22, which is oxidization off-gas, is discharged to the exterior.

Hydrogen gas is supplied from a non-illustrated hydrogen gas supply source to the gas passage forming member 21 through the fuel gas supply passage M1 along the gas flow direction P indicated by the arrow in FIG. 23. Also, the air is supplied from a non-illustrated air supply source to the gas passage forming member 22. This causes an electrochemical reaction to produce power in the power generation cell.

Patent Document 1 discloses a fuel cell similar to the configuration shown in FIG. 23.

As a conventional fuel cell, a fuel cell disclosed in Patent Document 2 has been proposed. As shown in FIG. 26, the fuel cell has a separator base plate 73, which is arranged between an air-electrode-side collector 71 and a fuel-electrode-side collector 72. With reference to FIG. 27, the air-electrode-side collector 71 is held in contact with a solid electrolyte membrane 74. The air-electrode-side collector 71 is configured by bottom portions 71a held in contact with an air-electrode-side diffusion layer 75 having a water repellent layer, top portions 71b held in contact with the separator base plate 73, and grid-like openings 71c formed in the bottom portions 71a and the top portions 71b. Oxidization gas is supplied to the air-electrode-side diffusion layer 75 via a gas passage formed in the air-electrode-side collector 71. Water produced in the gas passage through power generation flows downstream from the gas passage.

As another conventional fuel cell, a fuel cell disclosed in Patent Document 3 has been proposed. As illustrated in FIG. 28, in the fuel cell, an electrolyte-side gas supply passage 83 is formed between a gas diffusion layer 81 held in contact with an electrode structure 15 and a water drainage layer 82 formed by a porous body. A water drainage passage 85 is formed in a surface 84 of the water drainage layer 82. Specific suction means (not shown) is arranged in the water drainage passage 85. The water drainage passage 85 causes water generated in the gas supply passage 83 through power generation to permeate through slits formed in the water drainage layer 82 and introduces the water to the water drainage passage 85.

A fuel cell disclosed in Patent Document 4 has also been proposed as a conventional fuel cell. A water drainage tube having a through hole formed in a side wall, through which generated water permeates, is embedded in a cathode-side catalyst layer. A water drainage pump is connected to the water drainage tube through a line. The water drainage pump depressurizes the interior of the water drainage tube and thus draws the generated water from the cathode-side catalyst layer into the water drainage tube. The water is then directed to the exterior of a membrane-electrode assembly.

PRIOR ART REFERENCES

Patent Documents

Patent Document 1: Japanese Laid-Open Patent Publication No. 2007-87768
Patent Document 2: Japanese Laid-Open Patent Publication No. 2007-27055
Patent Document 3: Japanese Laid-Open Patent Publication No. 2005-158670
Patent Document 4: Japanese Laid-Open Patent Publication No. 2007-294339

SUMMARY OF THE INVENTION

The Problems that the Invention is to Solve

In the fuel cell disclosed in Patent Document 1, as shown in FIG. 25, a number of hexagonal ring portions 21a (22a) are formed in a serpentine manner in the gas passage forming member 21 (22). The fuel gas flows in the gas passage formed by the ring portions 21a (22a) and the through holes 21b (22b). In this configuration, water produced through power generation may easily adhere, through surface tension, to the wall surface of the gas passage, which extends in a complicated serpentine manner. As a result, some of the generated water may remain in the gas passage as water droplets, without being discharged from the gas passage of the gas passage forming member 21 (22) to the exterior. In this case, the problem described below occurs.

Specifically, if water droplets W are adhered to the surfaces of the gas diffusion layers 19, 20, as illustrated in FIG. 24, the water droplets W may block the fuel gas (the oxidization gas), thus preventing the fuel gas (the oxidization gas) from being supplied to the portions corresponding to the water droplets W in the gas diffusion layers 19, 20 and the electrode catalyst layers 17, 18. As a result, an appropriate cell reaction is prevented from occurring in the portions without fuel gas (oxidization gas) in the electrode catalyst layers 17, 18, thus lowering power generation efficiency. Also, the water droplets W adhered to the surfaces of the gas diffusion layers 19, 20 decrease the cross-sectional area of the gas passage. This hampers the flow of the fuel gas (the oxidization gas) and increases pressure loss of the fuel gas (oxidization gas), thus lowering the power generation efficiency. Further, the difference in the amount of the water droplets W remaining in the gas passage of the gas passage forming member 21 (22) from one power generation cell to another may vary the flow amounts of the fuel gas (the oxidization gas) in the power generation cells and the voltages of the power generated by the power generation cells. This decreases the output of the power generated by the fuel cell stack as a whole, or, in other words, is another factor for decrease of the power generation efficiency.

In contrast, the fuel cell disclosed in Patent Document 2 prevents formation of a water film on the surface of the air-electrode-side diffusion layer 75 having the water repellent layer. However, with reference to FIG. 27, since the air-electrode-side collector 71 has the grid-like openings 71c, generated water may easily adhere. As a result, droplets of the generated water are caught in a groove portion between each adjacent pair of the top portions 71b, which are held in contact with the separator base plate 73, or, in other words, the gas passage at the opposite side to the bottom portions 71a. This hampers supply of the gas and thus decreases the power generation efficiency.

The fuel cell disclosed in Patent Document 3 must include the specific suction means to introduce generated water from the gas supply passage 83 to the water drainage passage 85 through the slits in the water drainage layer 82, which is formed by the porous body. This consumes the generated power and thus prevents improvement of the power generation efficiency.

Since the fuel cell disclosed in Patent Document 4 must have the water drainage pump for draining the generated water, the generated power is consumed correspondingly. Improvement of the power generation efficiency is thus prevented.

Accordingly, it is a first objective of the present invention to provide a fuel cell capable of improving power generation efficiency by solving the problems of the above-described conventional techniques. It is a second objective of the invention to provide a fuel cell that improves the power generation efficiency and prolongs durability of an anode-side gas passage forming member and durability of a cathode-side electrode catalyst layer.

Means for Solving the Problems

To achieve the first objective of the present invention, and in accordance with a first aspect of the present invention, a fuel cell is provided that includes a first electrode catalyst layer laid on an anode side surface of an electrolyte membrane, a second electrode catalyst layer laid on a cathode side surface of the electrolyte membrane, a first gas passage forming member that is laid on a surface of the first electrode catalyst layer and has a first gas passage for supplying fuel gas, a second gas passage forming member that is laid on a surface of the second electrode catalyst layer and has a second gas passage for supplying oxidization gas, a first separator arranged in the first gas passage forming member, a second separator laid on a surface of the second gas passage forming member, an introducing passage and a discharging passage for the fuel gas, and an introducing passage and a discharging passage for the oxidization gas. The second gas passage forming member includes a flat plate and a plurality of projections that are formed integrally with the flat plate to form the second gas passage. A water passage is formed between a surface of the flat plate of the second gas passage forming member and a backside of the second separator corresponding to the second gas passage forming member. The water passage and the second gas passage communicate with each other through a communication hole formed by each of the projections that are shaped by cutting and raising in the second gas passage forming member. The water passage has a depth set to a value smaller than depth of the second gas passage. Water drawn from the second gas passage into the water passage through capillary action via the communication holes is drained to the oxidation gas discharging passage by pressure caused by the oxidization gas flowing in the second gas passage.

In the fuel cell according to present invention, it is preferable that the water passage extend continuously along the entire length from an end of the second gas passage forming member at a side corresponding to the oxidation gas introducing passage to an end of the second gas passage forming member at another side corresponding to the fuel gas discharging passage.

In the fuel cell according to present invention, it is preferable that a water drainage promoting member formed by a porous body having continuous pores be received in a portion of the second gas passage forming member in which the oxidation gas discharging passage and the water passage are joined together, and any one of the following configurations be selected: a configuration in which the average pore diameter of the continuous pores of the water drainage promoting member is set to a value smaller than the depth of the water passage; a configuration in which wettability of the continuous pores of the water drainage promoting member is set to a value higher than wettability of the water passage; and a configuration in which hydration property of the continuous pores of the water drainage promoting member is set to a value greater than hydration property of the water passage.

Also, in the fuel cell according to present invention, it is preferable that the second gas passage forming member be configured by the flat plate, first projections that are formed on the flat plate to form the second gas passage, and second projections that are formed on the flat plate to form the water passage. It is also preferable that: the first projections be shaped by cutting and raising toward the second electrode catalyst layer in such a manner that the first projections are arranged separately from one another at a plurality of positions on the flat plate material; the second projections project toward the second separator and be shaped through extrusion in such a manner that the second projections are arranged separately from one another at a plurality of positions on the flat plate material; and the communication holes be holes formed in the flat plate by the cutting and raising of the first projections.

In the fuel cell according to present invention, it is preferable that: the first projections be shaped like bridges; the communication holes be each formed in such a manner as to extend through the corresponding first projection in a direction perpendicular to a gas flow direction and have openings at two positions, which are a left end and a right end of the first projection as viewed in the gas flow direction; each pair of the first projections be adjacent to each other in the direction perpendicular to the gas flow direction and, in the pair of the first projections, the first projection located upstream in the gas flow direction has a downstream end adjacent to an upstream end of the first projection located downstream in the gas flow direction; and the second projections be arranged adjacent to the corresponding first projections from a downstream side of the gas flow direction.

In the fuel cell according to present invention, it is preferable that: the first projections and the second projections be arranged alternately in the direction perpendicular to the gas flow direction and configure a plurality of row-like projection groups; the projection groups be arranged parallel to one another and spaced apart at predetermined intervals in the gas flow direction; a band-like flat plate portion be formed between each adjacent pair of the rows of the projection groups with the water passage formed between the flat plate portions and the second separator; and the communication holes be each formed in such a manner as to have an opening facing upstream in the gas flow direction in the corresponding first projection.

In the fuel cell according to present invention, it is preferable that: the second gas passage forming member be configured by the flat plate and first projections that are formed on the flat plate to form the second gas passage; the first projections be shaped by cutting and raising toward the second electrode catalyst layer in such a manner that the first projections are arranged separately from one another at a plurality of positions on the flat plate material; the second separator include second projections projecting toward the flat plate to form the water passage between the second separator and the flat plate, the second projections being shaped through extrusion in such a manner that the second projections are arranged separately from one another at a plurality of positions on the second separator; and the communication holes be holes formed in the flat plate by the cutting and raising of the first projections.

In the fuel cell according to present invention, it is preferable that the first projections be each formed in a semi-cylindrical shape in such a manner that the corresponding communication hole has a semi-circular shape as viewed in a direction perpendicular to a gas flow direction.

In the fuel cell according to present invention, it is preferable that the first projections include two types, which are semi-cylindrical projections and flat table-like projections, the two types of projections being arranged alternately and separately from one another, a surface of each of the flat table-like projections held in contact with the second electrode catalyst layer is a flat surface, and a surface of each of the semi-cylindrical projections held in contact with the second electrode catalyst layer is an arcuate surface.

In the fuel cell according to present invention, it is preferable that: the second gas passage forming member be configured by the flat plate, first raised portions that are formed on the flat plate and serve as the projections for forming the water passage and the second gas passage, and second raised portions that are formed on the flat plate and serve as the projections for forming the second gas passage; the first raised portions be shaped through extrusion toward the second electrode catalyst layer in such a manner that the first raised portions are arranged separately from one another at a plurality of positions on the flat plate material; the second projections be shaped through extrusion toward the second separator in such a manner that the second projections are arranged separately from one another at a plurality of positions on the flat plate material; the first raised portions and the second raised portions be formed alternately at predetermined pitches in a direction perpendicular to a gas flow direction, thereby configuring raised portion groups extending in the direction perpendicular to the gas flow direction; the communication holes be each formed by the cutting and raising of the corresponding pair of the raised portions that are adjacent to each other in the gas flow direction; a flat surface portion be formed on the top of each of the first and second raised portions; and among the flat surface portions, the flat surface portion of each first raised portion corresponding to the second separator have a protuberance that contacts the second separator to form the water passage between the flat surface portion and the second separator.

In the fuel cell according to present invention, it is preferable that the first projections or the first raised portions be aligned in such a manner that the second gas passage includes two types, which are straight passage portions and serpentine passage portions.

In the fuel cell according to present invention, it is preferable that a water passage similar to said water passage be formed between the first gas passage forming member and the first separator, the first gas passage forming member being configured in the same manner as the second gas passage forming member.

In the fuel cell according to present invention, it is preferable that the depth of the water passage be set in the range of 10 to 50 μm, and the first gas passage or the second gas passage have a depth set to 30 to 1000 μm.

In the fuel cell according to present invention, it is preferable that a downstream opening of the water passage be extended to a position corresponding to a gas discharging passage, and a constriction being formed in the portion of the discharging passage corresponding to the opening in such a manner as to increase the flow velocity of gas.

In the fuel cell according to present invention, it is preferable that a gas passage be formed in the flat plate of the gas passage forming member and the separator in such a manner that the gas passage corresponds to a downstream side of the water passage and extends through the flat plate and the separator, the gas passage being a constriction for increasing the flow velocity gas.

To achieve the second object of the present invention, and in accordance with a second aspect of the present invention, a fuel cell is provided that includes a first electrode catalyst layer laid on an anode side surface of an electrolyte membrane, a second electrode catalyst layer laid on a cathode side surface of the electrolyte membrane, a first gas passage forming member that is laid on a surface of the first electrode catalyst layer and has a first gas passage for supplying fuel gas, a second gas passage forming member that is laid on a surface of the second electrode catalyst layer and has a second gas passage for supplying oxidization gas, a first separator laid on a surface of the first gas passage forming member, a second separator arranged in the second gas passage forming member, an introducing passage and a discharging passage for the fuel gas, and an introducing passage and a discharging passage for the oxidization gas. The first gas passage forming member includes a flat plate and a plurality of projections that are formed integrally with the flat plate to form the first gas passage. A water passage is formed between a surface of the flat plate of the first gas passage forming member and a backside of the first separator corresponding to the first gas passage forming member. The water passage and the first gas passage communicate with each other through a communication hole formed by each of the projections that are shaped by cutting and raising in the first gas passage forming member. The water passage has a depth set to a value smaller than depth of the first gas passage. Water drawn from the first gas passage into the water passage through capillary action via the communication holes is drained to the fuel gas discharging passage by pressure caused by the fuel gas flowing in the first gas passage.

In the fuel cell according to present invention, it is preferable that the water passage extend continuously along the entire range from an end of the first gas passage forming member at the side corresponding to the fuel gas introducing passage to an end of the first gas passage forming member at the side corresponding to the fuel gas discharging passage.

In the fuel cell according to present invention, it is preferable that a water drainage promoting member formed by a porous body having continuous pores be received in a portion of the first gas passage forming member in which the fuel gas discharging passage and the water passage are joined together, and any one of the following configurations be selected: a configuration in which the average pore diameter of the continuous pores of the water drainage promoting member is set to a value smaller than the depth of the water passage; a configuration in which wettability of the continuous pores of the water drainage promoting member is set to a value higher than wettability of the water passage; and a configuration in which hydration property of the continuous pores of the water drainage promoting member is set to a value greater than hydration property of the water passage.

In the fuel cell according to present invention, it is preferable that: the first gas passage forming member be configured by the flat plate, first projections that are formed on the flat plate to form the first gas passage, and second projections that are formed on the flat plate to form the water passage; the first projections be shaped by cutting and raising toward the first electrode catalyst layer in such a manner that the first projections are arranged separately from one another at a plurality of positions on the flat plate material; the second projections project toward the first separator and are shaped through extrusion in such a manner that the second projections are arranged separately from one another at a plurality of positions on the flat plate material; and the communication holes be holes formed in the flat plate by the cutting and raising of the first projections.

In the fuel cell disclosed in claim 12 according to present invention, it is preferable that: the first projections be shaped like bridges; the communication holes be each formed in such a manner as to extend through the corresponding first projection in a direction perpendicular to a gas flow direction and have openings at two positions, which are a left end and a right end of the first projection as viewed in the gas flow direction; each pair of the first projections be adjacent to each other in the direction perpendicular to the gas flow direction and, in the pair of the first projections, the first projection located upstream in the gas flow direction has a downstream end adjacent to an upstream end of the first projection located downstream in the gas flow direction; and the second projections be arranged adjacent to the corresponding first projections from a downstream side of the gas flow direction.

In the fuel cell according to present invention, it is preferable that: the first projections and the second projections be arranged alternately in the direction perpendicular to the gas flow direction and configure a plurality of row-like projection groups; the projection groups be arranged parallel to one another and spaced apart at predetermined intervals in the gas flow direction; a band-like flat plate portion be formed between each adjacent pair of the rows of the projection groups with the water passage formed between the flat plate portions and the first separator; and the communication holes be each formed in such a manner as to have an opening facing upstream in the gas flow direction in the corresponding first projection.

In the fuel cell according to present invention, it is preferable that: the first gas passage forming member be configured by the flat plate and first projections that are formed on the flat plate to form the first gas passage; the first projections be shaped by cutting and raising toward the first electrode catalyst layer in such a manner that the first projections are arranged separately from one another at a plurality of positions on the flat plate material; the first separator have second projections that are shaped through extrusion in such a manner that the second projections project toward the flat plate and are arranged separately from one another at a plurality of positions on the first separator; and the communication holes be holes formed in the flat plate by the cutting and raising of the first projections.

In the fuel cell according to present invention, it is preferable that: the first projections be each formed in a semi-cylindrical shape in such a manner that the corresponding communication hole has a semi-circular shape as viewed in a direction perpendicular to a gas flow direction.

In the fuel cell according to present invention, it is preferable that: the first projections include two types, which are semi-cylindrical projections and flat table-like projections, the two types of projections being arranged alternately and separately from one another, a surface of each of the flat table-like projections held in contact with the second electrode catalyst layer be a flat surface, and a surface of each of the semi-cylindrical projections held in contact with the second electrode catalyst layer be an arcuate surface.

In the fuel cell according to present invention, it is preferable that: the first gas passage forming member be configured by the flat plate, first raised portions that are formed on the flat plate and serve as the projections for forming the water passage and the first gas passage, and second raised portions that are formed on the flat plate and serve as the projections for forming the second gas passage; the first raised portions be shaped through extrusion toward the first electrode catalyst layer in such a manner that the first raised portions are arranged separately from one another at a plurality of positions on the flat plate material; the second projections be shaped through extrusion toward the first separator in such a manner that the second projections are arranged separately from one another at a plurality of positions on the flat plate material; the first raised portions and the second raised portions be formed alternately at predetermined pitches in a direction perpendicular to a gas flow direction, thereby configuring raised portion groups extending in a direction perpendicular to the gas flow direction; the communication holes be each formed by the cutting and raising of the corresponding pair of the raised portions that are adjacent to each other in the gas flow direction; a flat surface portion be formed on the top of each of the first and second raised portions; and among the flat surface portions, the flat surface portion of each first raised portion corresponding to the first separator have a protuberance that contacts the first separator to form the water passage between the flat surface portion and the first separator.

In the fuel cell according to present invention, it is preferable that the first projections or the first raised portions be aligned in such a manner that the second gas passage includes two types, which are straight passage portions and serpentine passage portions.

In the fuel cell according to present invention, it is preferable that the depth of the water passage be set in the range of 10 to 50 µm, and the depth of the first gas passage be set to 30 to 1000 µm.

In the fuel cell according to present invention, it is preferable that a downstream opening of the water passage be extended to a position corresponding to a gas discharging passage, the cross-sectional area of the discharging passage corresponding to the opening being set to such a small value that the flow velocity of gas increases.

In the fuel cell according to present invention, it is preferable that a water drainage passage be formed in the flat plate of the gas passage forming member and the separator and extends in a direction perpendicular to the flat plate and the separator, the cross-sectional area of the water drainage passage being set to such a small value that the flow velocity of gas increases.

(Operation)

If the water passage is formed at the cathode side, generated water in the gas passage of the cathode side gas passage forming member is drawn into the water passage through the capillary action via the communication holes. The water in the water passage is then drained to the discharging passage by the pressure caused by the oxidization gas flowing in the gas passage. As a result, the oxidization gas is adequately supplied to the electrode catalyst layer. This prevents deficiency of the oxidization gas and improves power generation efficiency. That is, the generated water is prevented from being trapped in the gas passage and loss of the pressure of the oxidization gas flowing in the gas passage caused by the generated water is reduced. The power generation efficiency is thus enhanced.

If the water passage is formed at the anode side, the seepage water in the gas passage of the anode side gas passage forming member is drawn into the water passage through the capillary action via the communication holes. The water in the water passage is then drained to the discharging passage by the pressure caused by the fuel gas flowing in the gas passage. As a result, the fuel gas is adequately supplied to the electrode catalyst layer. This prevents deficiency of fuel and improves power generation efficiency. That is, the seepage water is prevented from being trapped in the gas passage of the gas passage forming member and pressure loss in the fuel gas flowing in the gas passage caused by the seepage water is reduced. The power generation efficiency is thus enhanced. Since water is prevented from entering the anode side electrode catalyst layer, fuel deficiency is avoided in the electrode catalyst layer. This prevents the potential of the electrode catalyst layer from being raised through the fuel deficiency. As a result, the gas passage forming member is prevented from corroding due to a rise in the potential in the electrode catalyst layer.

Effects of the Invention

According to the present invention, when the water passage is formed at the anode side, the power generation efficiency is improved. Also, the durability of the anode side gas passage forming member and the durability of the cathode side electrode catalyst layer are enhanced. If the water passage is arranged at the cathode side, the power generation efficiency is increased.

DETAILED DESCRIPTION OF THE INVENTION

First Embodiment

A first embodiment of a fuel cell according to the present invention will now be described with reference to FIGS. 1 to 5.

Figure 1:
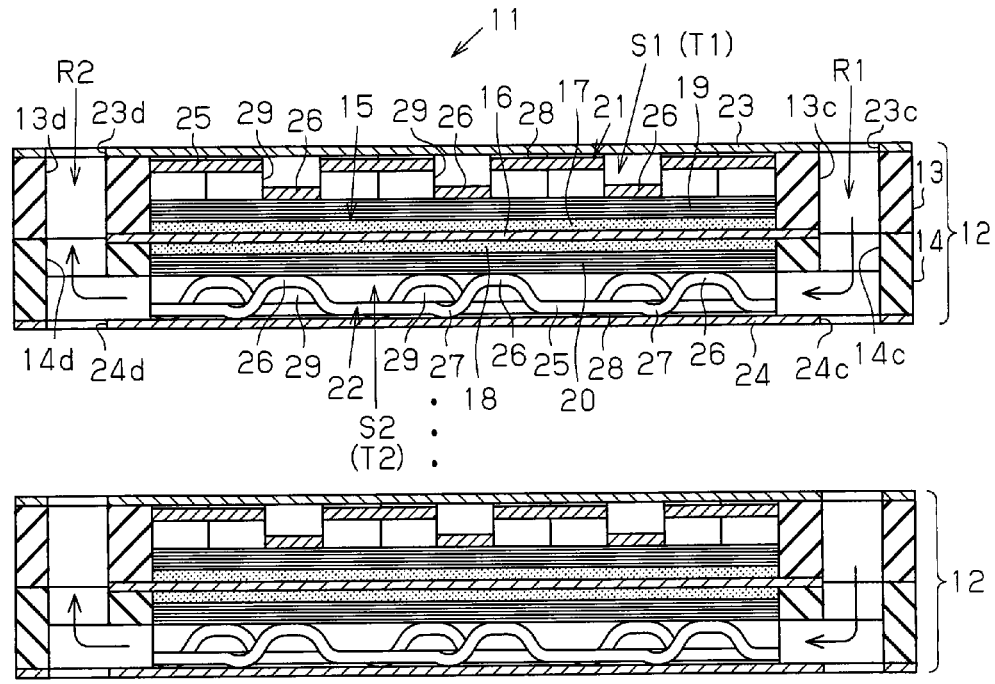
FIG. 1 is a longitudinal cross-sectional view showing a first embodiment of a fuel cell according to the present invention.

As illustrated in FIG. 1, a fuel cell stack 11 according to the first embodiment is a polymer electrolyte type fuel cell and configured by a number of power generation cells 12, which are stacked together.

Figure 2:
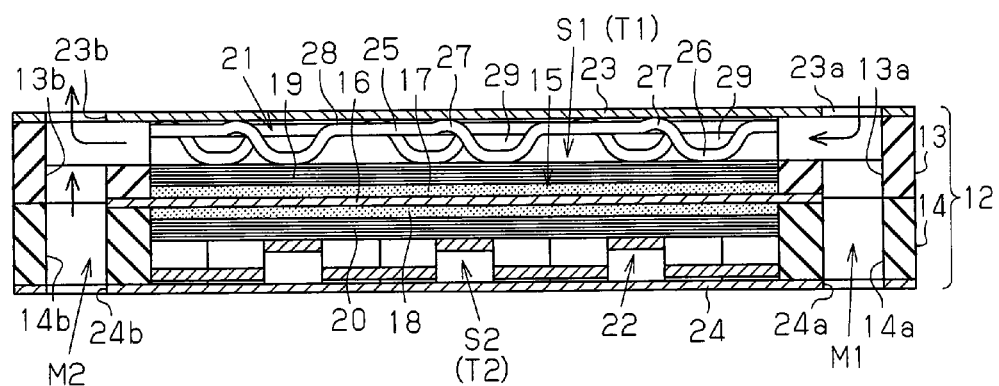
FIG. 2 is a longitudinal cross-sectional view showing a fuel cell.
Figure 3:
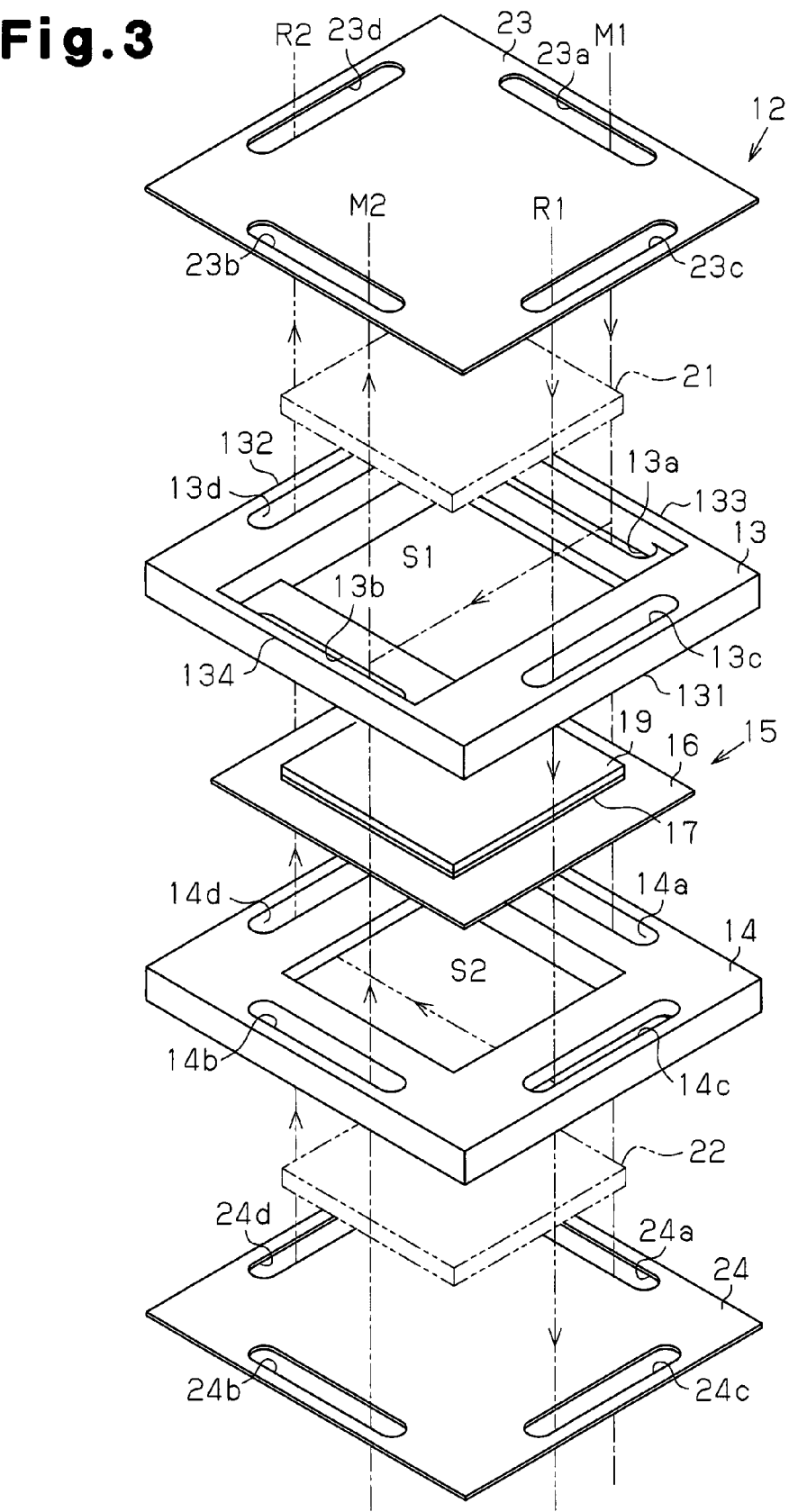
FIG. 3 is an exploded perspective view showing first and second frames, an electrode structure, first and second gas passage forming members, and a separator.

Referring to FIG. 3, each of the power generation cells 12 has a rectangular frame-like shape and includes first and second frames 13, 14, which are formed of synthetic rubber (or synthetic resin), and an MEA (Membrane-Electrode Assembly) 15 serving as an electrode structure. A fuel gas passage space S1 is defined in the inside of the first frame 13. An oxidization gas passage space S2 is defined in the inside of the second frame 14. The MEA 15 is arranged between the frames 13, 14. As shown in FIGS. 1 and 2, each power generation cell 12 has a first gas passage forming member 21 and a second gas passage forming member 22. The first gas passage forming member 21 is formed of ferrite based SUS (stainless steel) and received in the fuel gas passage space S1. The second gas passage forming member 22 is formed of titanium or gold and accommodated in the oxidization gas passage space S2. The power generation cell 12 also has a first separator 23 and a second separator 24, which are formed of titanium. The first separator 23 is shaped as a flat plate and joined to the top surface of the first frame 13 and the top surface of the first gas passage forming member 21, as viewed in the drawings. The second separator 24 is bonded to the bottom surface of the frame 14 and the bottom surface of the second gas passage forming member 22 as viewed in the drawings. In FIG. 3, the configuration of each of the gas passage forming members 21, 22 is illustrated as a flat plate for simplification.

As illustrated in FIGS. 1 and 2, the MEA 15 is configured by an electrolyte membrane 16, a first electrode catalyst layer 17, a second electrode catalyst layer 18, a conductive first gas diffusion layer 19, and a conductive second gas diffusion layer 20. The first electrode catalyst layer 17 is formed by catalyst laid on the anode-side surface, which is the top surface as viewed in the drawings, of the electrolyte membrane 16. The second electrode catalyst layer 18 is formed by catalyst laid on the cathode-side surface, which is the bottom surface as viewed in the drawings, of the electrolyte membrane 16. The gas diffusion layer 19 and the gas diffusion layer 20 are bonded to the surface of the electrode catalyst layer 17 and the surface of the electrode catalyst layer 18, respectively. When the fuel cell according to the first embodiment is used, the electrode structure 15 of each of the power generation cells 12 in the fuel cell stack 11 illustrated in FIG. 1 extends parallel to a vertical direction.

Figure 5:
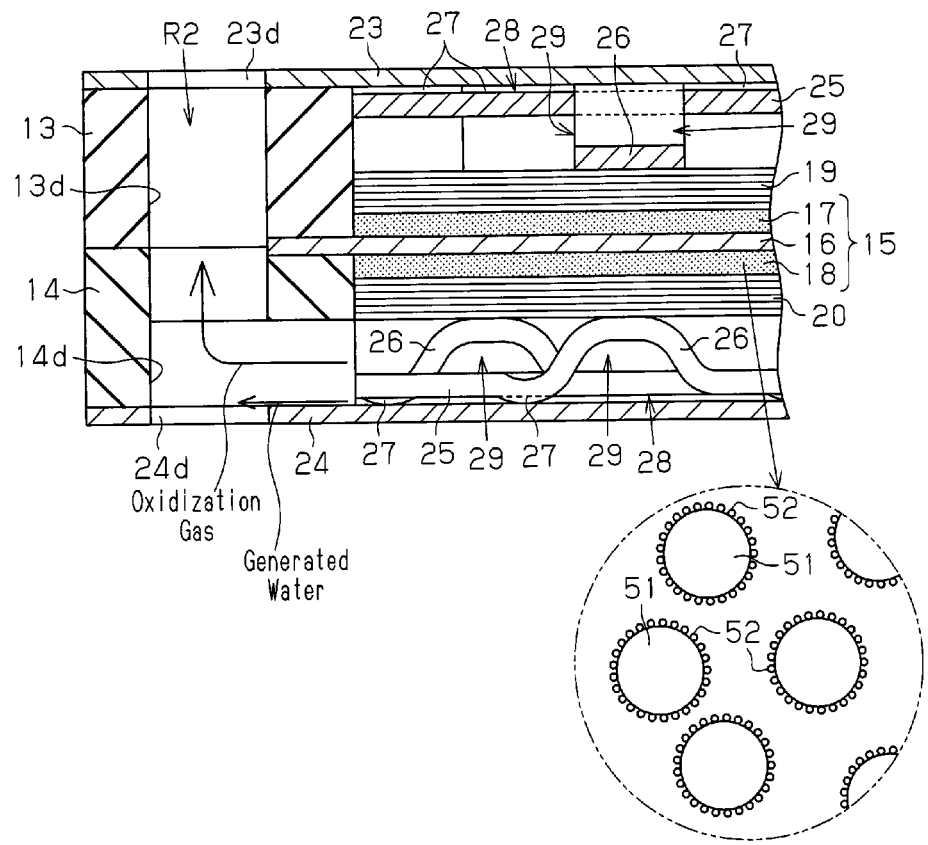
FIG. 5 is an enlarged longitudinal cross-sectional view showing a portion of a power generation cell.

The solid electrolyte membrane 16 is formed of a fluoropolymer membrane. As shown in FIG. 5, each of the electrode catalyst layers 17, 18 has carbon particles 51 that support the catalyst. A number of catalyst particles 52 formed of platinum (Pt) adhere to the surface of each of the carbon particles 51. The electrode catalyst layers 17, 18 are bonded to the solid electrolyte membrane 16 using paste for forming an electrode catalyst layer. The catalyst particles 52 serving as catalyst improve power generation efficiency when electric power is generated by the fuel cell. In the first embodiment, the particle size of each carbon particle 51 is several micrometers and the particle size of each catalyst particle 52 is 2 nm. The gas diffusion layers 19, 20 are formed by carbon paper sheets.

The gas passage forming members 21, 22 will hereafter be described with reference to FIG. 4. The first gas passage forming member 21, which is located at the anode-side, and the second gas passage forming member 22, which is arranged at the cathode-side, are configured identically. Accordingly, only the first gas passage forming member 21 will be described.

Figure 4:
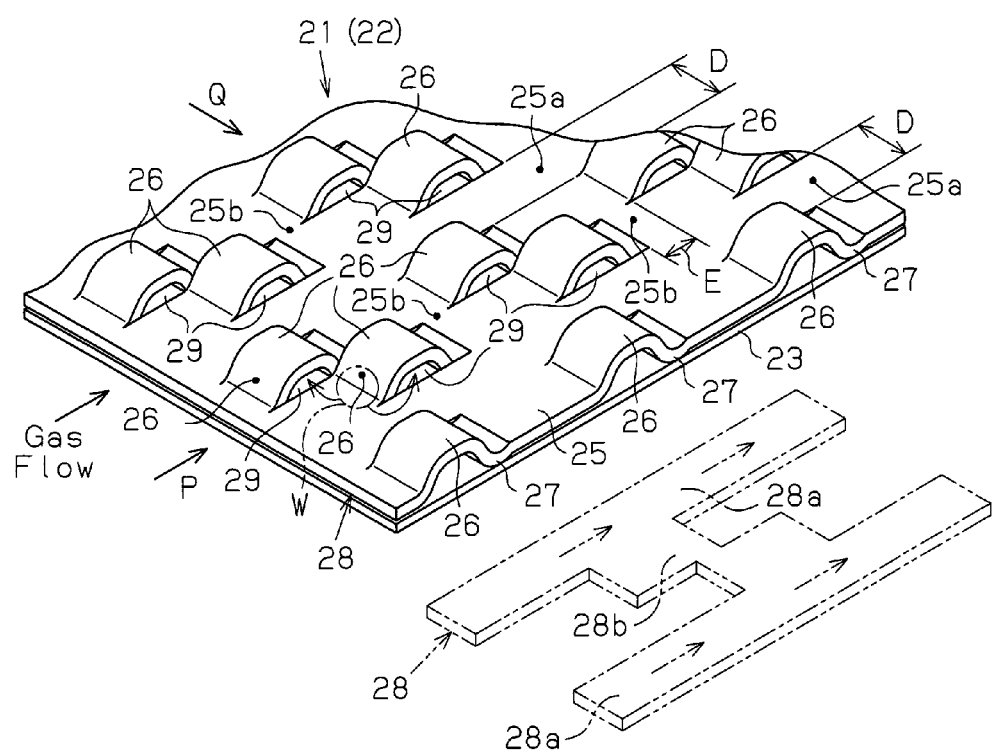
FIG. 4 is a perspective view showing the portion corresponding to a gas passage forming member.

As shown in FIG. 4, the first gas passage forming member 21 has a flat plate 25. A plurality of first projections 26 and a plurality of second projections 27 are formed separately from one another at a number of positions in the flat plate 25. The first projections 26 are projections for forming a gas passage and shaped by cutting and raising the flat plate 25 in such a manner as to project toward the first gas diffusion layer 19 (see FIG. 2). The second projections 27 are projections for forming a water passage and shaped by extrusion from the flat plate 25 in such a manner as to project toward the separator 23. By holding the first projections 26 in contact with the first gas diffusion layer 19 as illustrated in FIG. 2, a fuel gas passage T1 (which is also the fuel gas passage space S1) is formed between the flat plate 25 and the first gas diffusion layer 19. By holding the second projections 27 in contact with the separator 23, a water passage 28 is formed between the flat plate 25 and the separator 23.

With reference to FIG. 4, each of the first projections 26 has a bridge-like shape. Each first projection 26 has a communication hole 29 extending through the first projection 26 along the direction Q, which is perpendicular to the gas flow direction P. In other words, as viewed in the gas flow direction P, each of the communication holes 29 has two openings at the left end and the right end of the associated one of the first projections 26. The communication holes 29 allow communication between the gas passage T1 and the water passage 28. Each pair of the first projections 26 are adjacent to each other in the direction Q, which is perpendicular to the gas flow direction P. In each pair of the first projections 26, the downstream end of the projection located upstream in the gas flow direction P is adjacent to the upstream end of the projection downstream in the gas flow direction P. Each of the second projections 27 is arranged adjacent to the downstream end of the associated one of the first projections 26 from the downstream side in the gas flow direction P.

As shown in FIG. 4, the first projections 26 are aligned in rows that are spaced apart at predetermined intervals in the gas flow direction P. The rows of the first projections 26 are spaced apart at predetermined widths D in the direction Q perpendicular to the gas flow direction P. A plurality of parallel band-like flat plate portions 25a are formed in the flat plate 25. Each of the band-like flat plate portions 25a extends along the entire length of the flat plate 25 in the gas flow direction P. Band-like water passage portions 28a, which are portions of the water passage 28, are formed between the band-like flat plate portions 25a and the separator 23. Each of the band-like water passage portions 28a extends along the entire lengths of the flat plate 25 and the separator 23 in the gas flow direction P. The pairs of the first projections 26 are spaced apart at predetermined intervals E in the gas flow direction P. The flat plate 25 has flat plate portions 25b, which cross the corresponding band-like flat plate portions 25a. Water passage bypasses 28b, which are portions of the water passage 28, are formed between the flat plate portion 25b and the separator 23.

As shown in FIG. 3, the fuel gas passage space S1 in the first frame 13 has a rectangular shape as viewed from above. An elongated fuel gas inlet port 13a and an elongated fuel gas outlet port 13b, which communicate with the fuel gas passage space S1, are formed in a side 131 and an opposite side 132 of the first frame 13, respectively, which are parallel to each other. An elongated oxidization gas inlet port 13c and an elongated oxidization gas outlet port 13d are formed in a side 133 and an opposite side 134 of the frame 13, respectively, which are adjacent to the corresponding sides 131, 132.

The second frame 14 is configured identically with the first frame 13. The second frame 14 has a fuel gas inlet port 14a, a fuel gas outlet port 14b, an oxidization gas inlet port 14c, and an oxidization gas outlet port 14d, which are formed in correspondence with the fuel gas inlet port 13a, the fuel gas outlet port 13b, the oxidization gas inlet port 13c, and the oxidization gas outlet port 13d of the frame 13.

A fuel gas inlet port 23a, a fuel gas outlet port 23b, an oxidization gas inlet port 23c, and an oxidization gas outlet port 23d are formed in four sides of the first separator 23 in correspondence with the fuel gas inlet port 13a, the fuel gas outlet port 13b, the oxidization gas inlet port 13c, and the oxidization gas outlet port 13d, which are formed in the first frame 13. Similarly, a fuel gas inlet port 24a, a fuel gas outlet port 24b, an oxidization gas inlet port 24c, and an oxidization gas outlet port 24d are formed in four sides of the second separator 24 in correspondence with the fuel gas inlet port 14a, the fuel gas outlet port 14b, the oxidization gas inlet port 14c, and the oxidization gas outlet port 14d, which are formed in the second frame 14.

With reference to FIG. 1, the first (second) gas passage forming member 21 (22) contacts the surface of the gas diffusion layer 19 (20) and the backside of the first (second) separator 23 (24) in the fuel gas passage space S1 (the oxidization gas passage space S2) in the frame 13 (14).

Referring to FIGS. 1 and 3, the fuel gas inlet port 23a of the first separator 23, the fuel gas inlet port 13a of the frame 13, the fuel gas inlet port 14a of the second frame 14, and the fuel gas inlet port 24a of the second separator 24 form the fuel gas supply passage M1 in each power generation cell 12. The fuel gas outlet port 23b of the first separator 23, the fuel gas outlet port 13b of the first frame 13, the fuel gas outlet port 14b of the second frame 14, the fuel gas outlet port 23b of the separator 23, and the fuel gas outlet port 24b of the second separator 24 form the fuel gas discharging passage M2 in each power generation cell 12. After having been supplied from the exterior of the fuel cell to the fuel gas supply passage M1, the fuel gas flows through the gas passage T1 in the first gas passage forming member 21 and is used for power generation. The fuel gas is then introduced into the fuel gas discharging passage M2 as fuel off-gas.

The oxidization gas inlet port 23c of the first separator 23, the oxidization gas inlet port 13c of the frame 13, the oxidization gas inlet port 14c of the second frame 14, and the oxidization gas inlet port 24c of the second separator 24 form an oxidization gas supply passage R1 in each power generation cell 12. The oxidization gas outlet port 23d of the first separator 23, the oxidization gas outlet port 13d of the first frame 13, the oxidization gas outlet port 14d of the second frame 14, and the oxidization gas outlet port 24d of the second separator 24 form a discharging passage R2 for discharging oxidization off-gas in each power generation cell 12. After having been supplied from the exterior of the fuel cell to the oxidization gas supply passage R1, oxidization gas passes through the gas passage T2 in the second gas passage forming member 22 and is used for power generation. The oxidization gas is then directed to the oxidization gas discharging passage R2 as oxidization off-gas.

In the first embodiment, the height of the portion of each projection 26 projecting from the corresponding band-like flat plate portion 25a, or, in other words, the depth of the gas passage T1, T2 in the first or second gas passage forming member 21, 22, is set in, for example, the range of 30 to 1000 μm, or, preferably, the range of 30 to 300 μm. In an example, the aforementioned height or depth is set to 200 μm. The height of the portion of each second projection 27 projecting from the corresponding flat plate portion 25a, or, in other words, the depth of the water passage 28, is set in the range of 10 to 50 μm. In an example, the aforementioned height or depth is set to 30 μm. In this manner, the water passage 28 is formed in a slit-like manner and has a depth smaller than the depth of each gas passage T1, T2. As a result, through capillary action of the slit-like water passage 28, the water in the gas passage T1, T2 is easily drawn into the water passage 28 through the communication holes 29. The width D of each band-like flat plate portion 25a represented in FIG. 4 is set in the range of 100 to 300 μm. The interval E between the flat plate portions 25b is set in the range of 50 to 150 μm.

Operation of the fuel cell configured in the above-described manner will hereafter be described.

With reference to FIG. 2, when the fuel gas flows in the gas passage T1 in the first gas passage forming member 21 along the direction indicated by the corresponding arrow after having been supplied to the fuel gas supply passage M1, the fuel gas hits a number of first projections 26 and causes turbulent flow in the fuel gas. This diffuses the fuel gas in the gas passage T1. The fuel gas is then diffused more adequately by passing through the first gas diffusion layer 19 and thus uniformly distributed in the first electrode catalyst layer 17.

As illustrated in FIG. 1, when the oxidization gas flows in the gas passage T2 in the second gas passage forming member 22 along the direction indicated by the corresponding arrow after having been supplied to the oxidization gas supply passage R1, the oxidization gas hits a number of first projections 26 and causes turbulent flow in the oxidization gas. This diffuses the oxidization gas in the gas passage T2. The oxidization gas is then diffused more adequately by passing through the second gas diffusion layer 20 and thus uniformly distributed in the electrode catalyst layer 18. As the fuel gas and the oxidization gas are supplied, an electrode reaction occurs in the MEA 15, generating power. A desired amount of electric power is thus output from the fuel cell stack 11, which is configured by the stacked power generation cells 12.

When the power is generated as has been described, water is generated in the gas passage T2 in the second gas passage forming member 22 at the cathode side. Some of hydrogen gas that has not been used for generation of the power flows through the gas passage T1 in the first gas passage forming member 21 and the fuel gas discharging passage M2 and is discharged to the exterior as fuel off-gas. Some of the oxidization gas that has not been oxidized through the power generation passes through the oxidization gas discharging passage R2 formed in the frames 13, 14 and is discharged to the exterior as oxidization off-gas together with nitrogen gas. Some of the generated water permeates through the second electrode catalyst layer 18 at the cathode side, the solid electrolyte membrane 16, the first electrode catalyst layer 17, and the first gas diffusion layer 19 and flows to the gas passage T1 in the first gas passage forming member 21 as seepage water.

When flowing in the gas passage T1 as indicated by the corresponding arrow in FIG. 2, the fuel gas strikes a number of first projections 26, which are shown in FIG. 4. At this stage, the seepage water contained in the fuel gas adheres to the front surfaces of the first projections 26 as water droplets W. The water droplets W (the seepage water) flow into the interiors of the first projections 26 through the communication holes 29, which are formed in the first projections 26, by the pressure caused by the flowing fuel gas. The seepage water is introduced into the water passage 28 through the capillary action of the water passage 28, which is formed like a slit. After having been drawn to the water passage 28, the seepage water is retained in the water passage 28 as retained water through surface tension of the water. The retained water acts to cause a water droplet (seepage water) from the gas passage T1 to be exposed to the retained water via the communication hole 29. At this stage, the property of the water droplet to decrease the surface area draws the water droplet toward the retained water in the water passage 28. The retained water (the seepage water) that has entered the water passage 28 is directed downstream in the gas flow direction P by the pressure produced by the fuel gas flowing in the gas passage T1 and thus introduced into the fuel gas discharging passage M2.

The water generated in the gas passage T2 in the second gas passage forming member 22 at the cathode side is directed to the oxidization gas discharging passage R2 in the same manner as the water droplets (the seepage water) at the anode side that are drained in the above-described manner.

A fuel cell according to the first embodiment has the advantages described below.

(1) In the first embodiment, the water passage 28 is formed between the separator 23 and the flat plate 25 of the first gas passage forming member 21 having the first and second projections 26, 27 at the anode side. The depth of the water passage 28 is smaller than the depth of the gas passage T1. The seepage water in the gas passage T1 formed between the flat plate 25 and the first gas diffusion layer 19 is introduced into the water passage 28 through the communication holes 29 formed in the first projections 26. The seepage water that has been introduced into the water passage 28 is directed to the fuel gas discharging passage M2 by the pressure caused by the flowing fuel gas. Since the fuel gas is adequately supplied to the first electrode catalyst layer 17 in this configuration, a hydrogen shortage is avoided in the first electrode catalyst layer 17. The power generation efficiency is thus improved.

The seepage water in the gas passage T1 in the first gas passage forming member 21 flows to the water passage 28 through the communication holes 29 and is directed to the fuel gas discharging passage M2. This prevents the seepage water from remaining in the gas passage T1 and reduces the pressure loss of the fuel gas flowing in the gas passage T1 caused by the seepage water, thus improving the power generation efficiency. This also prevents corrosion of the first gas passage forming member 21 caused by a rise in electric potential in the first electrode catalyst layer 17 at the anode side, which is caused by the hydrogen shortage in the first electrode catalyst layer 17, thus enhancing durability of the first gas passage forming member 21. As a result, the material of the first gas passage forming member 21 can be selected more flexibly. That is, inexpensive material may be used as the material for the first gas passage forming member 21, and cost for materials is reduced.

(2) In the first embodiment, the water passage 28 is arranged between the separator 24 and the flat plate 25 of the second gas passage forming member 22 at the cathode side. The water generated in the gas passage T2 in the second gas passage forming member 22 at the cathode side is introduced into the oxidization gas discharging passage R2 through the water passage 28. This prevents the generated water from remaining in the gas passage T2 in the second gas passage forming member 22 and decreases loss of the pressure of the oxidization gas flowing in the gas passage T2 caused by the generated water, thus improving the power generation efficiency. Also, the oxidization gas is supplied adequately to the electrode catalyst layer 18, thus preventing a shortage of the oxidization gas. This enhances the power generation efficiency.

(3) In the first embodiment, the water passages 28 are arranged at the anode side and the cathode side. The seepage water and the generated water in the gas passages T1, T2 are thus adequately introduced into the fuel gas discharging passages M2, R2. This prevents variation in the outputs of the power generated by the power generation cells 12, thus stabilizing the power generation characteristics of the fuel cell. For example, when the fuel cell is in a low-load operating state, the flow velocity of the gas flowing in each gas passage T1, T2 of the gas passage forming member 21, 22 is low. The amount of the seepage water and the amount of the generated water remaining in the gas passage T1, T2 thus become unbalanced. However, in the first embodiment, the water passages 28 drainage water adequately in each power generation cell 12. This cancels the variation in the outputs of the power produced by the power generation cells 12 and improves the cell characteristics. In contrast, when the fuel cell is in a high-load operating state, the amount of the water generated in the gas passage T2 of the second gas passage forming member 22 at the cathode side is great. Since the generated water is drained adequately through the water passages 28, diffusion performance of the oxidization gas in the gas passage T2 is improved and the output of the power generation is stabilized.

(4) In the first embodiment, as shown in FIG. 4, the fuel gas hits the front surface of each first projection 26 at the upstream side in the gas flow direction P. This makes it easy for the seepage water in the fuel gas to adhere to the first projection 26 as a water droplet W. However, the second projections 27 are arranged downstream from the corresponding first projections 26. Accordingly, the water droplets W that have entered the interior of the first projection 26 through the communication hole 29 are caused to strike the corresponding second projection 27. The water droplets W are thus adequately divided and directed into the corresponding band-like water passage portion 28a and the corresponding water passage bypass 28b.

(5) In the first embodiment, with reference to FIG. 4, the band-like water passage portions 28a, which extend continuously along the entire length of the flat plate 25 in the gas flow direction P, are employed as the water passage 28. As a result, the seepage water (the generated water) that has entered the band-like water passage portions 28a is smoothly directed to the fuel gas discharging passage M2 (R2).

(6) In the first embodiment, the water passage bypasses 28b are formed between the rows of the band-like water passage portions 28a. Accordingly, as shown in FIG. 4, the seepage water (the generated water) is introduced into the corresponding water passage bypass 28b through the communication hole 29 of the first projection 26 that is located downstream in the associated adjacent pair of the first projections 26. The seepage water is then guided smoothly from the water passage bypass 28b to the band-like water passage portion 28a. As a result, the seepage water (the generated water) is drained efficiently.

Second Embodiment

A second embodiment of the present invention will hereafter be described with reference to FIGS. 6 to 8. In the embodiments described below, same or like reference numerals are given to components having functions that are the same as or like functions of corresponding components of the first embodiment and description of the components is omitted. That is, the description below focuses on the differences in the configuration, operation, and effects between the first embodiment and the other embodiments.

Figure 7:
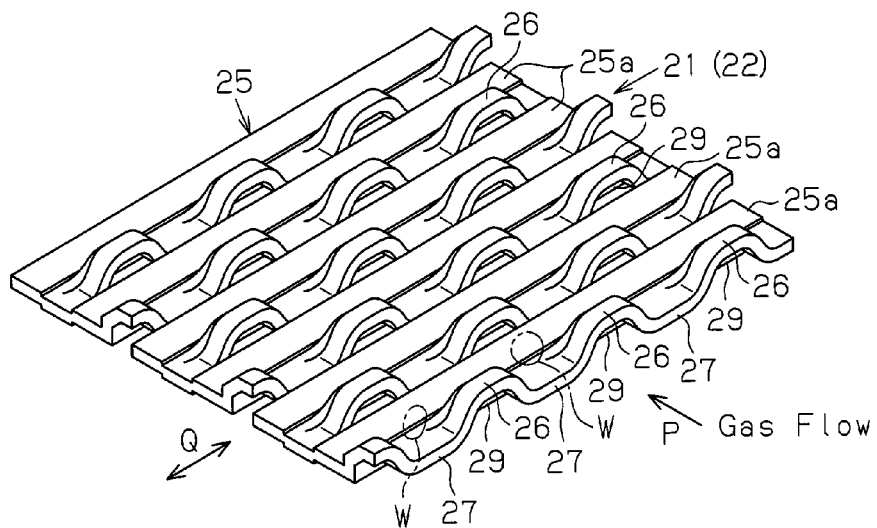
FIG. 7 is a perspective view showing the portion of the fuel cell illustrated in FIG. 6 corresponding to a gas passage forming member.

As shown in FIG. 7, in the second embodiment, the first projections 26 and the second projections 27 formed in each gas passage forming member 21, 22 are aligned in rows alternately in the direction Q perpendicular to the gas flow direction P. Each of the first projections 26 is connected to two of the second projections 27 that are adjacent to the first projection 26 in the direction Q. The first projections 26 and the second projections 27 configure a plurality of row-like projection groups extending along the direction Q in the flat plate 25. The projection groups are arranged parallel to each other and spaced apart at predetermined intervals in the gas flow direction P. A number of band-like flat plate portions 25a extending in the direction Q are formed between the projection groups in the flat plate 25 and arranged parallel to each other. The communication holes 29, each of which has an opening facing upstream in the flow direction P of the fuel gas (the oxidization gas), are formed in the first projections 26. The communication holes 29 communicate with the corresponding band-like water passage portions 28a, which are formed between the band-like flat plate portions 25a and the separator 23 (24).

Figure 6:
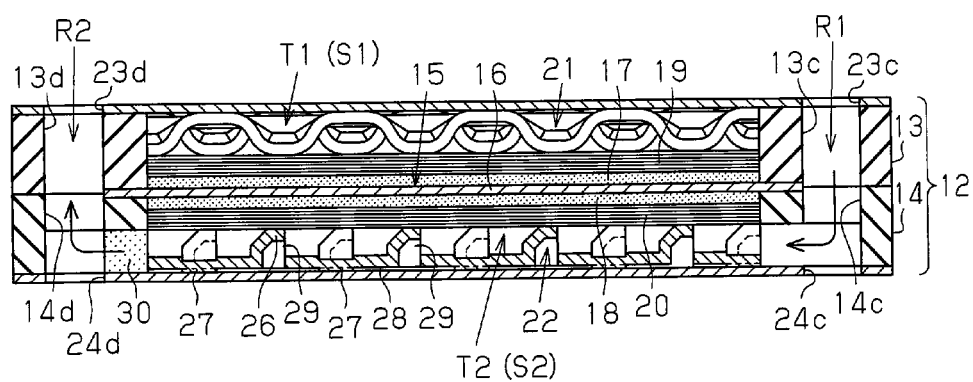
FIG. 6 is a longitudinal cross-sectional view showing a second embodiment of the fuel cell according to the invention.
Figure 8:
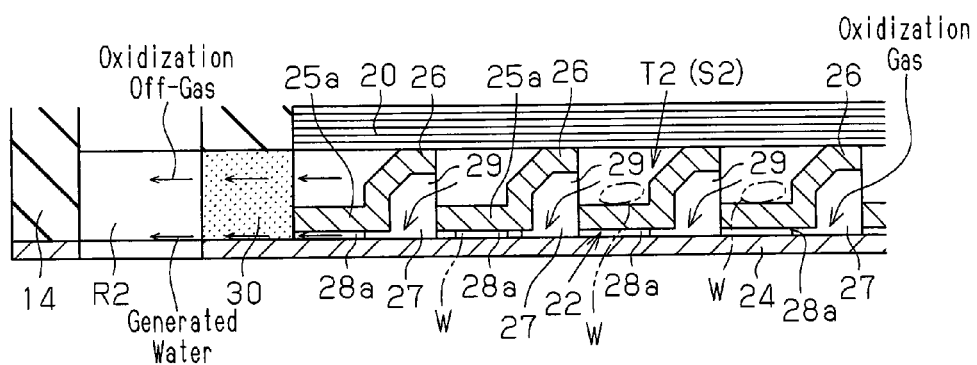
FIG. 8 is an enlarged cross-sectional view showing a portion of the fuel cell in FIG. 6.

The band-like water passage portions 28a extend in the direction Q as illustrated in FIG. 7 and are divided from one another by the projection groups in the gas flow direction P as illustrated in FIGS. 6 and 8.

With reference to FIGS. 6 and 8, a water drainage promoting member 30 formed by, for example, a porous body having continuous pores such as a urethane sponge or a marine sponge is accommodated in the portion of the second gas passage forming member 22 in which the oxidization gas discharging passage R2, the gas passage T2 of the second gas passage forming member 22, and the water passage 28 are joined together. The porosity of the continuous pores of the water drainage promoting member 30 is set in the range of 50 to 80 volume percent. The average diameter of the continuous pores is set to a value (which is, for example, 50 to 25 μm) smaller than the depth of the water passage 28 (10 to 50 μm). The water drainage promoting member 30 allows the oxidization off-gas from the gas passage T2 to pass smoothly through the water drainage promoting member 30 and absorbs the seepage water (the generated water) flowing from the water passage 28 through the capillary action of the continuous pores.

In the second embodiment, the thickness of the first gas passage forming body 21 as a whole is set to, for example, 300 μm. The height of the portion of each first projection 26 projecting from the flat plate 25 is set to 170 μm. The height of the portion of each second projection 27 projecting from the flat plate 25 is set to 30 μm. The width of each first projection 26 and the width of each band-like flat plate portion 25a in the gas flow direction P are both set to 200 μm.

Operation of the fuel cell according to the second embodiment, which has the above-described configuration, will now be described.

The seepage water and the generated water are drained in the same manner from the gas passage T1 at the anode side and the gas passage T2 at the cathode side. Accordingly, with reference to FIGS. 7 and 8, only drainage of the generated water at the cathode side will hereafter be described.

As shown in FIG. 7, the communication hole 29 formed in each first projection 26 has an opening facing upstream in the gas flow direction P. As a result, pressure produced by the flowing oxidization gas causes the water droplets W of the generated water adhered to the top surface of the band-like flat plate portion 25a to enter the band-like water passage portion 28a via the corresponding communication holes 29.

Referring to FIG. 8, generated water W that has entered an upstream one of the communication holes 29 from the gas passage T2 adheres to the backside of the separator 24 and flows to the water passage 28 by the pressure caused by the oxidization gas flowing from the gas passage T2 to the communication hole 29. The generated water W in the water passage 28 is directed to a downstream one of the communication holes 29 by the pressure produced by the oxidization gas flowing into the communication hole 29 and flows further downstream along the backside of the separator 24. The generated water W is then introduced into a downstream one of the band-like water passage portions 28a. As this operation is repeated sequentially, the generated water is drained into the oxidization gas discharging passage R2. Accordingly, even though the band-like water passage portions 28a are divided by the first projections 26 in the gas flow direction P as in the case of the second embodiment, the water passage 28 functions substantially in the same manner as the band-like water passage portions 28a that communicate with one another in the gas flow direction P.

The oxidization off-gas flowing from the gas passage T2 in the second gas passage forming member 22 passes through the continuous pores of the water drainage promoting member 30 and is then drained into the oxidization gas discharging passage R2. The generated water in the most downstream one of the band-like water passage portions 28a is introduced into the water drainage promoting member 30 through the capillary action of the water drainage promoting member 30. After having entered the water drainage promoting member 30, the generated water is drained positively by the pressure produced by the oxidization off-gas flowing through the continuous pores of the water drainage promoting member 30. The generated water is thus efficiently drained into the oxidization gas discharging passage R2.

As has been described, also in the second embodiment, the seepage water and the generated water in the gas passage T1 in the anode-side gas passage forming member 21 and the gas passage T2 in the cathode-side gas passage forming member 22 are adequately drained through the water passage 28 (the band-like water passage portions 28a). In other words, the fuel cell of the second embodiment has the advantages that are the same as the advantages of the fuel cell of the first embodiment.

Further, the water drainage promoting member 30 improves water drainage performance in the second embodiment, compared to a configuration without a water drainage promoting member 30.

Third Embodiment

A third embodiment of the present invention will hereafter be described with reference to FIGS. 9 to 13.

Figure 10:
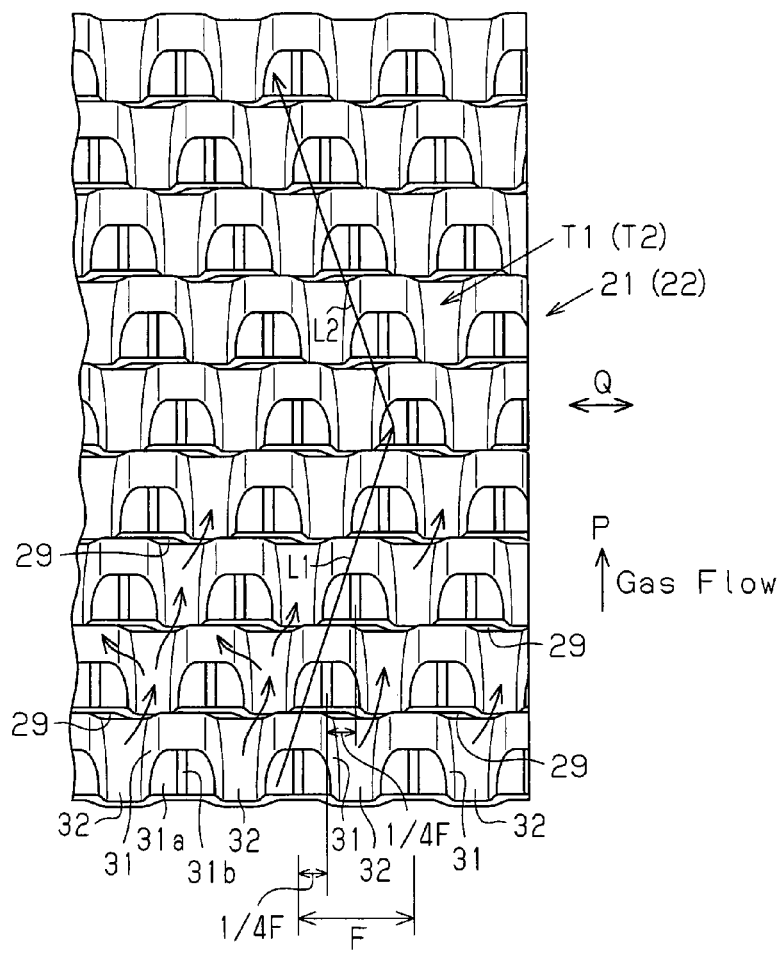
FIG. 10 is a plan view showing the portion corresponding to a gas passage forming member in the fuel cell illustrated in FIG. 9.
Figure 11:
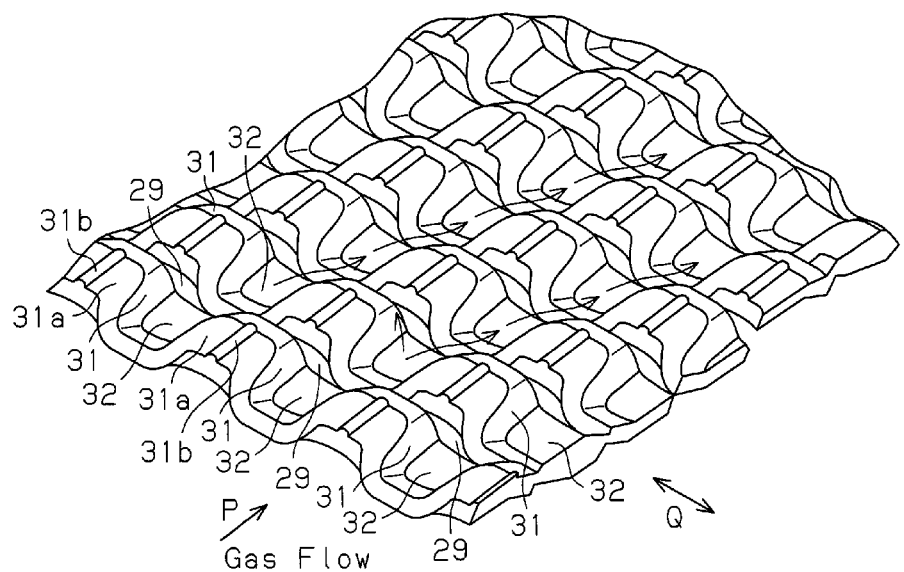
FIG. 11 is a perspective view showing the portion corresponding to a gas passage forming member in the fuel cell illustrated in FIG. 9.

As shown in FIGS. 10 and 11, the first gas passage forming member 21 at the anode side includes a number of first raised portions 31 serving as projections for forming the water passage 28 and the gas passage T1, which are extruded toward the first separator 23. The first gas passage forming member 21 also has a number of second raised portions 32 serving as projections for forming the gas passage T1, which are extruded toward the gas diffusion layer 19. The first raised portions 31 and the second raised portions 32 are arranged alternately at equal pitches along the direction Q perpendicular to the gas flow direction P and form a number of raised portion sets extending in the direction Q. A flat surface portion 31a corresponding to the backside of the separator 23 is formed on the top portion of each of the first raised portions 31. A strip-like protuberance 31b, which extends parallel to the gas flow direction P, is formed on the flat surface portion 31a. The protuberances 31b are held in contact with the backside of the separator 23 in such a manner that the water passage 28 is formed between the flat surface portions 31a and the separator 23. Similarly, a flat surface portion 32a is formed on the top portion of each of the second raised portions 32. The flat surface portions 32a are held in surface contact with the first gas diffusion layer 19. The strip-like protuberances 31b may be replaced by protuberances having other shapes including a spherical shape.

With reference to FIG. 10, in each of the raised portion groups, alignment pitches F for the first raised portions 31 in the direction Q perpendicular to the gas flow direction P are equal. Hereinafter, the raised portion groups illustrated in FIG. 10 will be referred to as first to ninth raised portion groups sequentially along the flow direction P. The second to fifth raised portion groups are arranged offset sequentially from the first raised portion group in a rightward direction by a quarter of the alignment pitch F along the direction Q perpendicular to the gas flow direction P. The sixth to ninth raised portion groups are arranged offset sequentially from the fifth raised portion group in a leftward direction by a quarter of the alignment pitch F along the direction Q perpendicular to the gas flow direction P. The raised portion groups of the first gas passage forming member 21 other than the first to ninth raised portion groups are arranged in the same manner.

The communication holes 29 are each formed between the corresponding first raised portion 31 and the adjacent second raised portion 32 in the gas flow direction P. The communication holes 29 are shaped by cutting and raising when the raised portions 31, 32 are forged from a flat plate. The first raised portions 31 and the second raised portions 32 in the first gas passage forming member 21 form the gas passage T1. When gas flows in the gas passage T1, a turbulent flow of the gas occurs.

The second gas passage forming member 22 at the cathode side is configured in the same manner as the first gas passage forming member 21.

Figure 9:
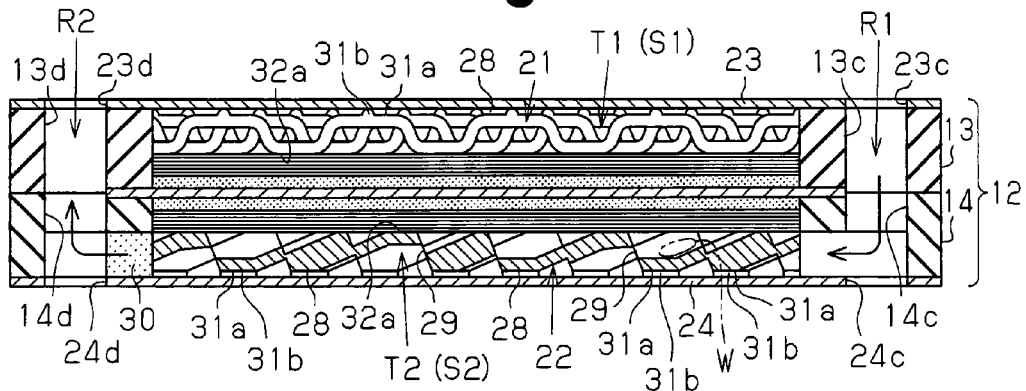
FIG. 9 is a longitudinal cross-sectional view showing a third embodiment of the fuel cell according to the invention.

In the third embodiment, as illustrated in FIG. 9, the oxidization gas that has entered the gas passage T2 of the gas passage forming member 22 from the cathode-side supply passage R1 meanders and diffuses as turbulent flows as indicated by the corresponding arrows in FIG. 10 and thus flows to the oxidization gas discharging passage R2. The water droplets W of the generated water in the gas passage T2 flow to the water passage 28 through the communication holes 29 through the capillary action of the water passage 28, which is formed by the flat surface portions 31a arranged separately from one another and the separator 24. After having flowed to the water passage 28, the generated water is moved downstream along the backside of the separator 24 through the water passage 28 by the pressure produced by the gas flowing in the gas passage T2. As this operation is repeated, the water passage 28 guides the generated water smoothly to the downstream side. In FIG. 10, the flow paths of the generated water W are represented by the arrows L1 and L2.

The third embodiment also includes the water drainage promoting member 30. This improves water drainage performance compared to a configuration without a water drainage promoting member 30.

(Modifications)

The illustrated embodiments may be modified to the forms described below.

Figure 12:
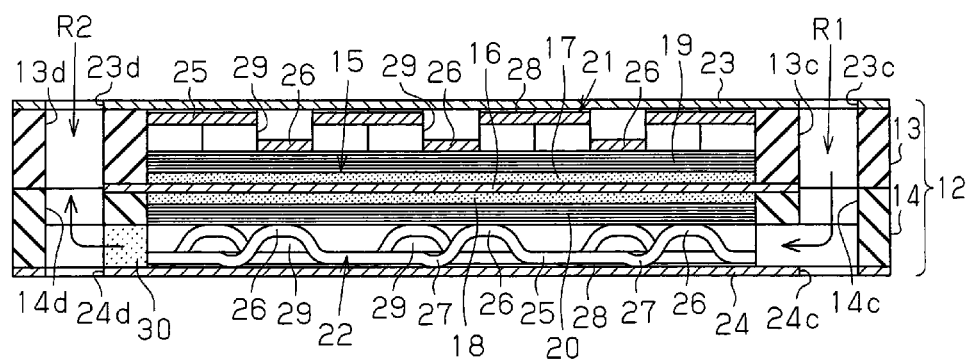
FIG. 12 is a longitudinal cross-sectional view showing a modification of the fuel cell according to the invention.

As illustrated in FIG. 12, in the fuel cell according to the first embodiment, the water drainage promoting member 30 may be arranged in the portion in the second gas passage forming member 22 in which the oxidization gas discharging passage R2 and the water passage 28 are joined together. Similarly, although not illustrated, the water drainage promoting member 30 may be arranged in the portion in the first gas passage forming member 21 in which the fuel gas discharging passage M2 and the water passage 28 are joined together. This configuration ensures efficient drainage of the generated water (the seepage water) from each water passage 28 by means of the water drainage promoting member 30.

Figure 13:
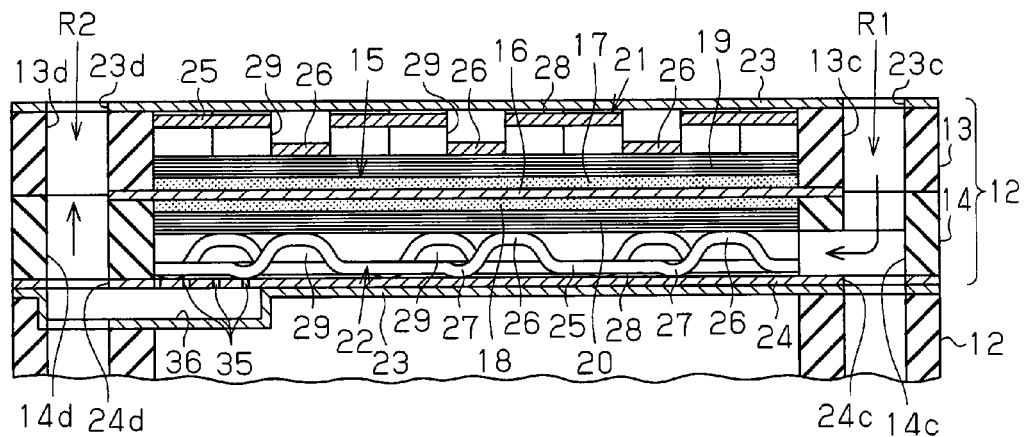
FIG. 13 is a longitudinal cross-sectional view showing another modification of the fuel cell according to the invention.
Figure 14:
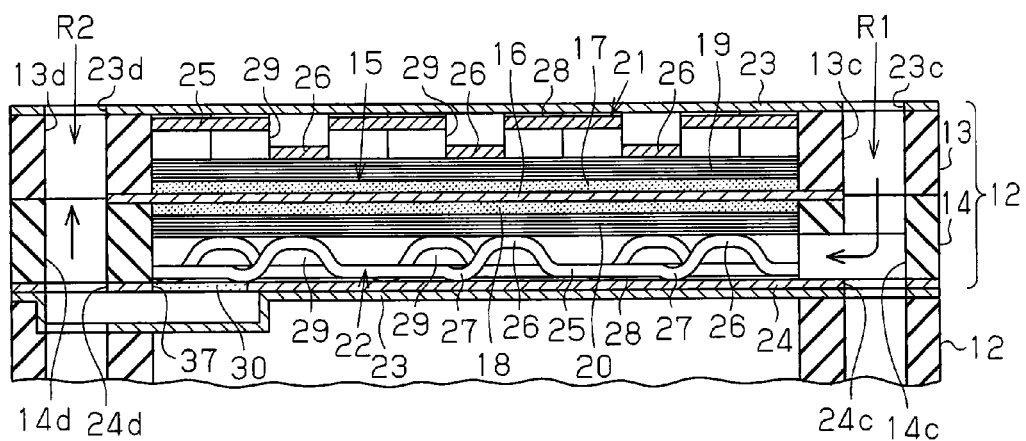
FIG. 14 is a longitudinal cross-sectional view showing another modification of the fuel cell according to the invention.

As shown in FIG. 13, in the fuel cell according to the first embodiment, a number of water drainage holes 35 may be formed in the separator 24. In this case, a communication passage 36 is formed in the portion of the separator 23 corresponding to the water drainage holes 35. In this configuration, the oxidization off-gas and the generated water are drained into the oxidization gas discharging passage R2 through the water drainage holes 35. Alternatively, referring to FIG. 14, a single water drainage port 37 may be formed in the separator 24 with the water drainage promoting member 30 received in the water drainage port 37.

Figure 15A:
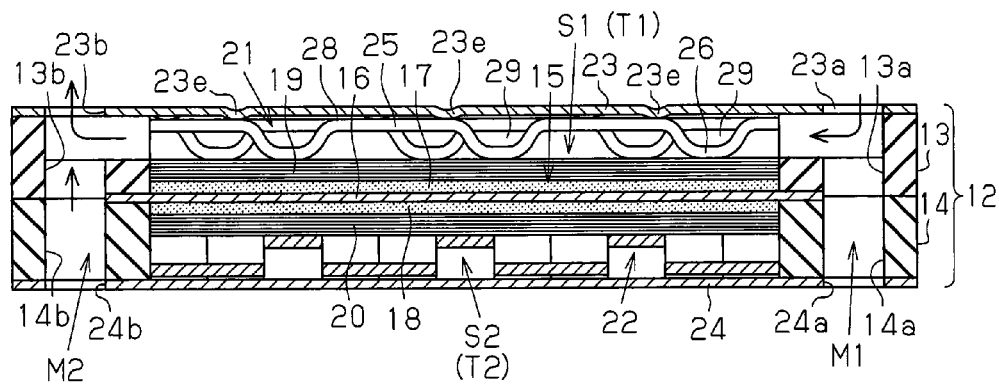
FIG. 15 is a longitudinal cross-sectional view showing another modification of the fuel cell according to the invention.
Figure 15B:
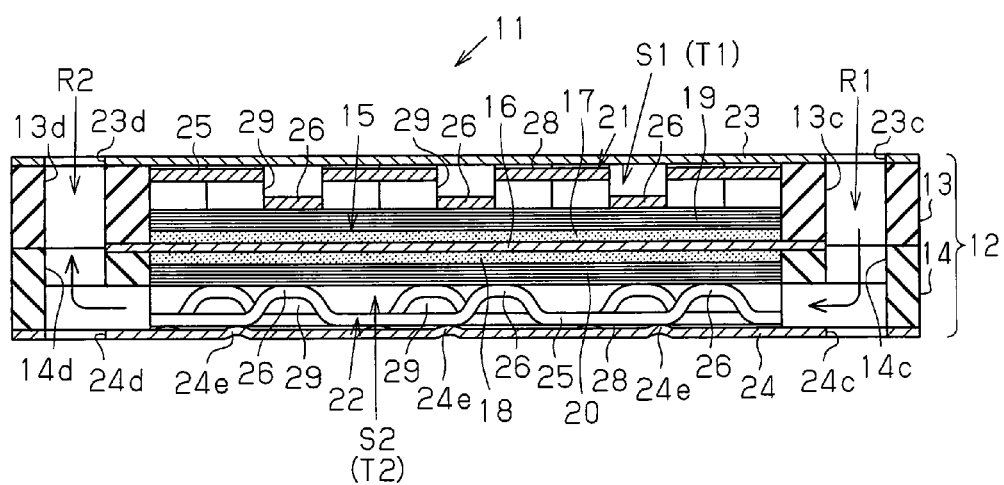

As shown in FIG. 15(a), the second projections 27 may be omitted from the first gas passage forming member 21 and second projections 23e, which function in the same manner as the second projections 27, may be formed in the first separator 23 through pressing. Similarly, with reference to FIG. 15(b), the second projections 27 may be omitted from the second gas passage forming member 22 and second projections 24e, which function in the same manner as the second projections 27, may be formed in the second separator 24 through pressing.

In the first embodiment, as illustrated in FIG. 4, each communication hole 29 has the openings at the left end and the right end as viewed in the gas flow direction P. However, the invention is not restricted to this. That is, each communication hole 29 may have an opening or three or more openings.

Figure 16:
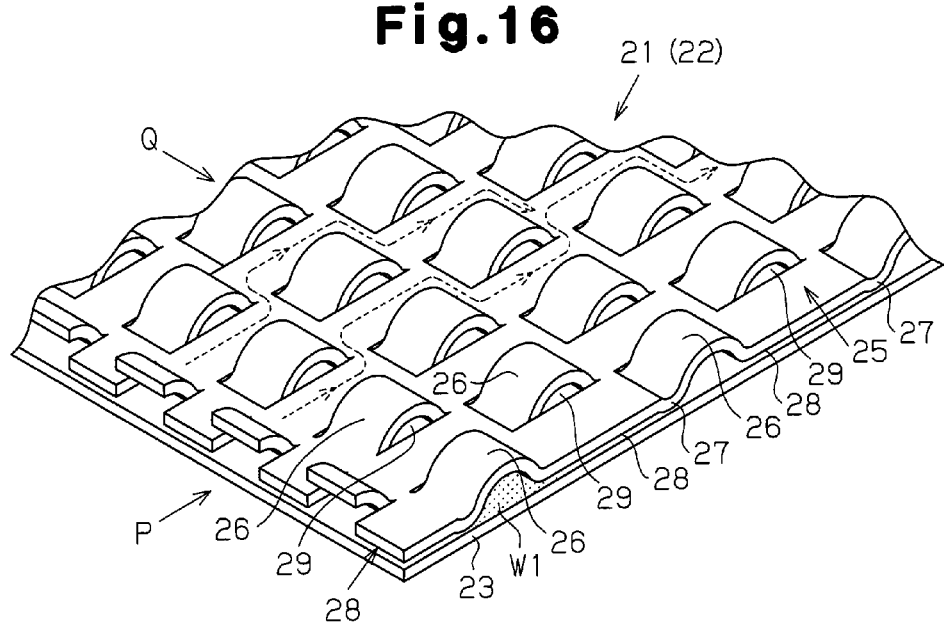
FIG. 16 is a perspective view showing a portion of another modification of the fuel cell according to the invention.
Figure 17:
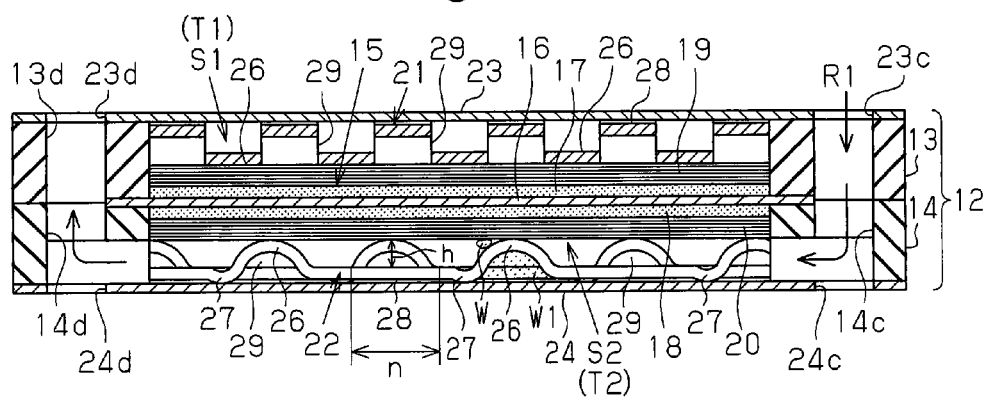
FIG. 17 is a longitudinal cross-sectional view showing a fuel cell employing the gas passage forming member illustrated in FIG. 16.

As shown in FIGS. 16 and 17, each first projection 26 may have a semi-cylindrical shape. Specifically, as viewed in the direction Q perpendicular to the gas flow direction P, each first projection 26 has a semi-annular shape and each communication hole 29 has a semicircular shape. With reference to FIG. 17, the proportion of the height h of each first projection 26 to the width n of the first projection 26 in the gas flow direction P may be small. In this embodiment, the second projections 27 are located upstream from the first projections 26. The first projections 26 are located separately from one another in such a manner that the water passage 28 meanders as indicated by the broken lines.

In this embodiment, the inner peripheral surface of the inner space of each first projection 26 is shaped as an arcuate surface as illustrated in FIG. 17. Accordingly, the water generated in the gas passage T2 is introduced into the inner space of the corresponding first projection 26 and retained stably. This improves water retaining performance of the first projection 26. Specifically, water droplets adhered to the surface of the second gas diffusion layer 20 tend to become spherical in shape through surface tension. This makes it easy for the water droplets to enter the semi-cylindrical inner space of the corresponding first projection 26. Water droplets on the surface of the second gas diffusion layer 20 are thus prevented from developing, and shortage of the gas caused by the droplets is avoided. The power generation efficiency is thus improved. Also, the second gas diffusion layer 20 is prevented from being deteriorated focally through adhesion of a water droplet. The durability of the diffusion layer 20 is thus enhanced.

Figure 18A:
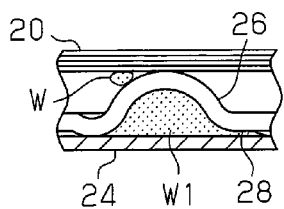
FIG. 18 is a perspective view showing a portion of another modification of the fuel cell according to the invention.
Figure 18B:
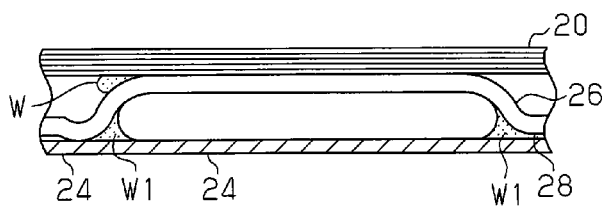
Figure 19:
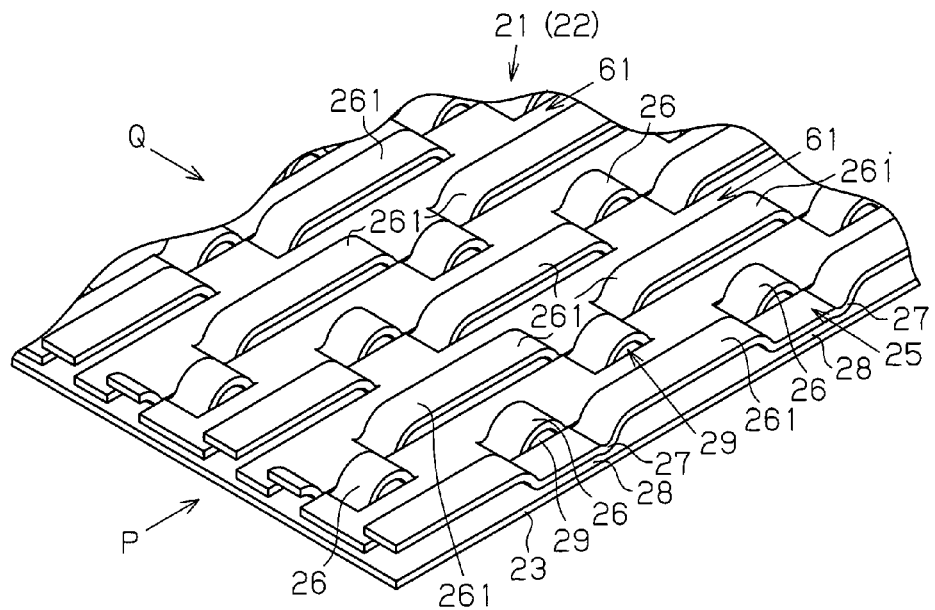
FIG. 19 is a longitudinal cross-sectional view showing a fuel cell employing the gas passage forming member illustrated in FIG. 18.
Figure 20:
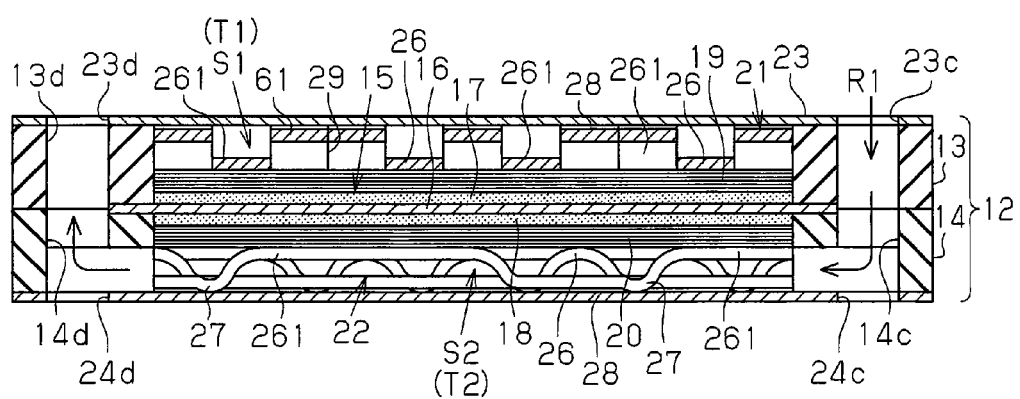
FIG. 20 is a plan view showing a portion of the gas passage forming member illustrated in FIG. 18.

As illustrated in FIGS. 18 to 20, differently shaped first projections may be employed. Specifically, the separator 23 includes semi-cylindrical first projections 26 and flat table-like first projections 261, which are arranged separately from one another. As viewed in the direction Q, which is perpendicular to the aforementioned gas flow direction P, each of the first projections 26 has a semi-cylindrical shape. Since each of the first projections 261 has a flat table-like shape, the contact area between the first projection 261 and the second gas diffusion layer 20 is increased. As illustrated in FIG. 20, band-like flat plate portions 25a including neither the two types of first projections 26, 261 nor the second projections 27 are formed with respect to the gas flow direction P. In other words, the gas passage T2 has straight band-like gas passage portions T2s formed by the band-like flat plate portions 25a. The gas passage T2 has serpentine gas passage portions T2d in addition to the gas passage portions T2s. Each of the gas passage portions T2d is formed by the corresponding first projections 26, which are arranged alternately at opposite sides, and a corresponding flat plate portion 25c formed by the corresponding flat table-like first projections 261 with respect to the gas flow direction P. The water passage 28 is formed flat similarly to the gas passage portions T2s, T2d at the backside of the two types of gas passage portions T2s, T2d.

In this embodiment, compared to a separator including only the semi-cylindrical first projections 26 arranged separately from one another, the contact area with the second gas diffusion layer 20 is increased by the flat table-like first projections 261. This prevents the first projections 26 from biting into the second gas diffusion layer 20 and decreases resistance of the passage to the generated power. The performance of the multiple semi-cylindrical first projections 26 to retain the generated water as droplets is also enhanced, and the effect of the configuration illustrated in FIG. 16 is ensured. Further, the straight band-like gas passage portions T2s reduces pressure loss of the gas in the passage, thus decreasing loss of the power in a peripheral device for supplying gas, such as a compressor.

Figure 21:
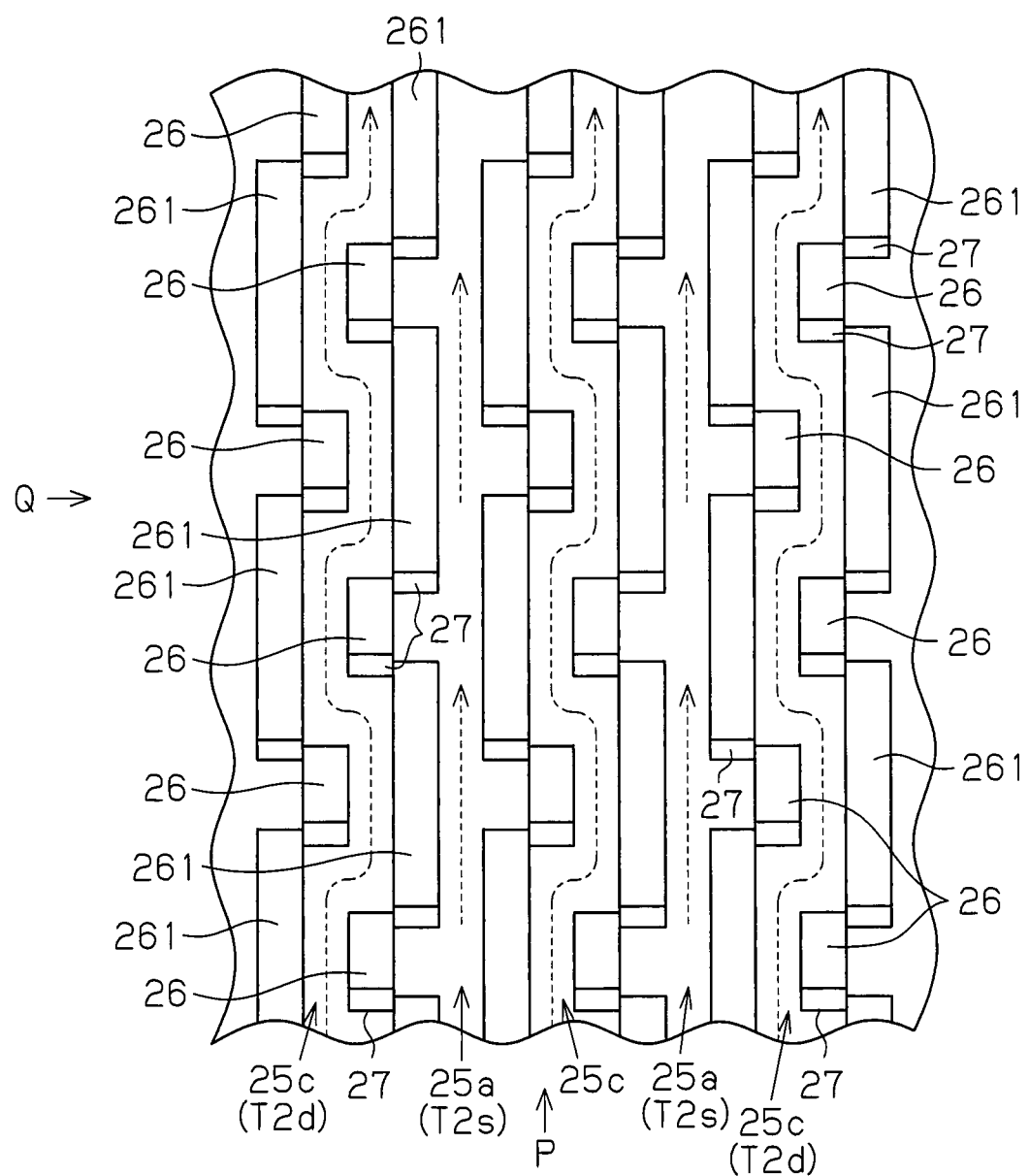
FIG. 21 is a longitudinal cross-sectional view showing another modification of the fuel cell according to the invention.

As illustrated in FIG. 21, a downstream end 21a (the downstream opening of the water passage 28) of the gas passage forming member 21 may be extended to the discharging passage M2. A protrusion 13e is formed on the wall surface of the fuel gas outlet port 13b of the frame 13 facing the downstream end 21a. Further, a constriction 41 for decreasing the cross-sectional area of the discharging passage M2 and increasing the flow velocity of the fuel gas is arranged between the protrusion 13e and the end 21a. In this embodiment, through the Venturi effect of the gas flowing in the constriction 41 at a high velocity, the water is adequately drawn out from the water passage 28. Drainage of the water is thus performed further adequately.

Figure 22:
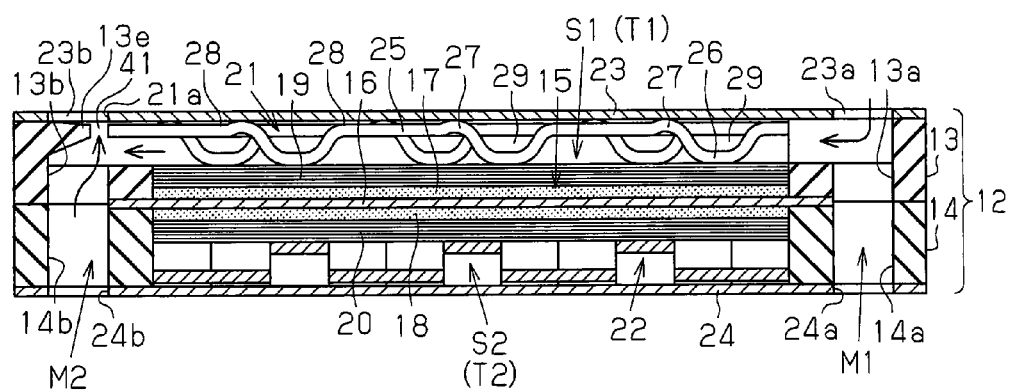
FIG. 22 is a longitudinal cross-sectional view showing another modification of the fuel cell according to the invention.
Figure 23:
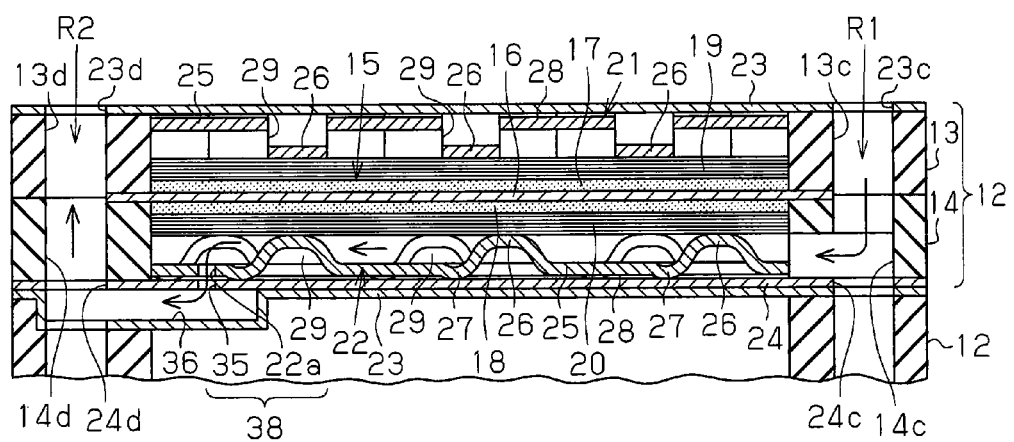
FIG. 23 is a longitudinal cross-sectional view showing a conventional fuel cell.
Figure 24:
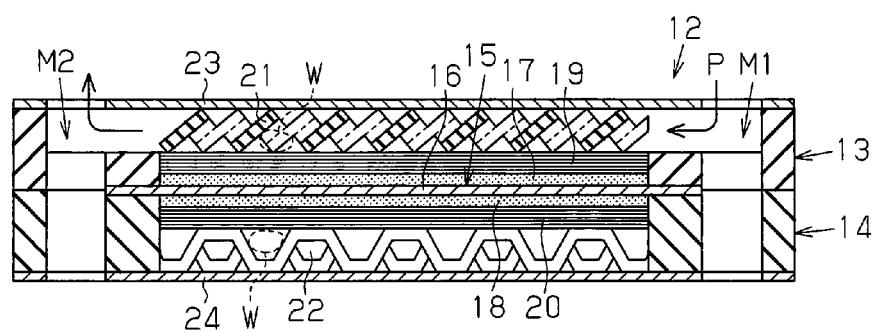
FIG. 24 is an enlarged cross-sectional view showing a portion of the fuel cell illustrated in FIG. 23.
Figure 25:
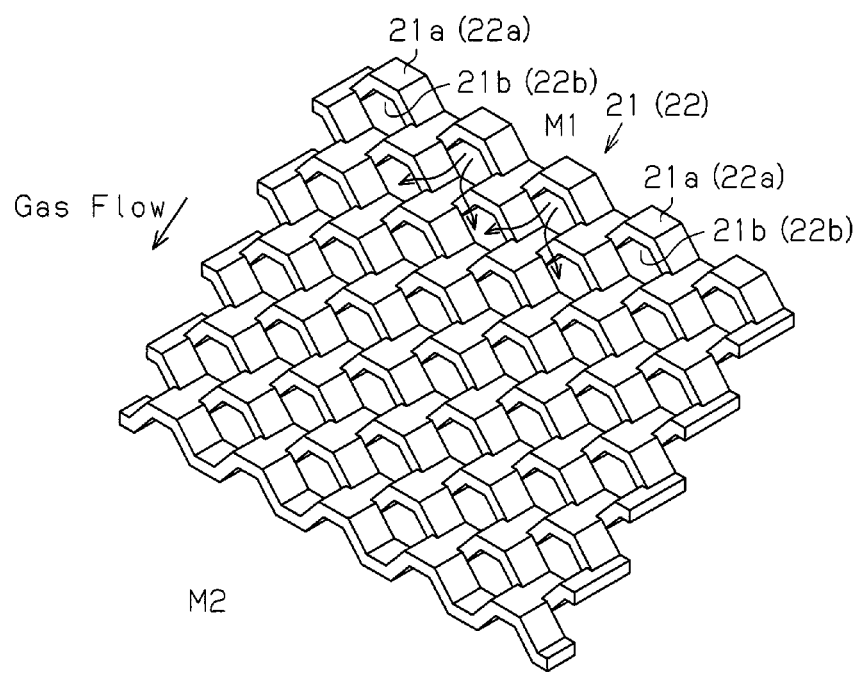
FIG. 25 is a perspective view showing the portion corresponding to a gas passage forming member used in the fuel cell illustrated in FIG. 23.
Figure 26:
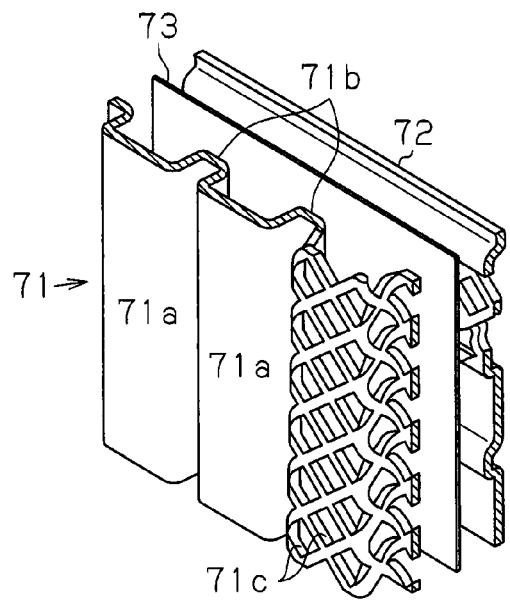
FIG. 26 is a perspective view showing a portion of another conventional fuel cell.
Figure 27:
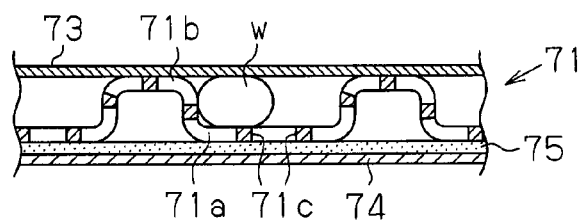
FIG. 27 is a cross-sectional view plan showing a portion of the fuel cell illustrated in FIG. 26.
Figure 28:
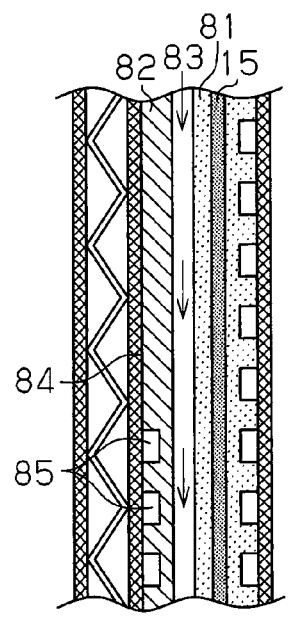
FIG. 28 is a longitudinal cross-sectional view showing another conventional fuel cell.

With reference to FIG. 22, gas passage portions 21b may be formed in the flat plate 25 of the gas passage forming member 21 so that the water drainage holes 35 formed in the separator 24 function as gas passage portions. Also, the gas passage portions 21b and the water drainage holes 35 may each function as a constriction 38. Also in this embodiment, through the Venturi effect of the gas flowing in the constrictions 38 at a high velocity, the water is adequately drawn out from the water passage 28, and drainage of the water is further improved.

In the above-described modified embodiments, the aforementioned two types of gas passage portions T2s, T2d may be formed by changing the layout of a projection or raised portion.

In the second embodiment, the average diameter of the continuous pores of the water drainage promoting member 30 is set to a value (for example, 5 to 25 µm) smaller than the depth (10 to 50 µm) of the water passage 28. In this manner, the water is drained from the water passage 28 into the continuous pores of the water drainage promoting member 30 through the capillary action. Alternatively, the wettability of the continuous pores of the water drainage promoting member 30 may be set to a value higher than the wettability of the water passage 28. In other words, the droplet contact angle of the continuous pores of the water drainage promoting member 30 may be set to a value greater than the droplet contact angle of the water passage 28. As another alternative, the hydration property of the continuous pores of the water drainage promoting member 30 may be set to a value greater than the hydration property of the water passage 28. In these cases, even if the average diameter of the continuous pores of the water drainage promoting member 30 is greater than the depth of the water passage 28, the water is adequately drained from the water passage 28 into the continuous pores of the water drainage promoting member 30.

In the third embodiment, the protuberances 31b are formed in the flat surface portions 31a formed in the first raised portion 31 of each gas passage forming member 21, 22. However, the protuberances 31b may be omitted. Alternatively, protuberances functioning in the same manner as the protuberances 31b may be formed in each separator 23, 24.

Although not illustrated, in each of the illustrated embodiments, the water passage 28 may be arranged only at the anode side. This configuration improves the power generation efficiency of the fuel cell and enhances the durability of the second gas passage forming member 22 at the anode side and the durability of the electrode catalyst layer 18 at the cathode side. Alternatively, the water passage 28 may be arranged only at the cathode side. This configuration improves the power generation efficiency of the fuel cell.

In the fuel cell of each of the illustrated embodiments, a groove for coolant may be formed in each separator 23, 24 of the power generation cell 12.

In the fuel cell of each of the illustrated embodiments, the gas diffusion layers 19, 20 may be omitted.

In the fuel cell having the water passage 28 arranged only at the cathode side, the first gas passage forming member 21 and the first separator 23 at the anode side may be formed integrally with each other. Alternatively, the frame 13 and the first separator 23 may be formed of metal material as an integral body through, for example, forging.

In a fuel cell having the water passage 28 arranged only at the anode side, the second gas passage forming member 22 and the second separator 24 at the cathode side may be formed integrally with each other. Alternatively, the frame 14 and the second separator 24 may be formed of metal material as an integral body through, for example, by forging.

The invention claimed is:

1. A fuel cell comprising:
a first electrode catalyst layer laid on an anode side surface of an electrolyte membrane;
a second electrode catalyst layer laid on a cathode side surface of the electrolyte membrane;
a first gas passage forming member that is laid on a surface of the first electrode catalyst layer and has a first gas passage for supplying fuel gas;
a second gas passage forming member that is laid on a surface of the second electrode catalyst layer and has a second gas passage for supplying oxidization gas;
a first separator arranged in the first gas passage forming member;
a second separator laid on a surface of the second gas passage forming member;
an introducing passage and a discharging passage for the fuel gas; and
an introducing passage and a discharging passage for the oxidization gas;
wherein the second gas passage forming member is configured by a flat plate, a plurality of first projections that are formed on the flat plate to form the second gas passage, and a plurality of second projections that are formed on the flat plate to form the water passage, and the first projections and the second projections project toward the opposite sides of the second gas passage forming member,
a water passage is formed between a surface of the flat plate of the second gas passage forming member and a backside of the second separator corresponding to the second gas passage forming member,
the water passage and the second gas passage are formed on the opposite sides of the second gas passage forming member and communicate with each other through a communication hole formed by each of the first projections that are shaped by cutting and raising in the second gas passage forming member,
the water passage has a depth set to a value smaller than depth of the second gas passage, and
water drawn from the second gas passage into the water passage through capillary action via the communication holes is drained to the oxidation gas discharging passage by pressure caused by the oxidization gas flowing in the second gas passage.

2. The fuel cell according to claim 1, wherein the water passage extends continuously along the entire length from an end of the second gas passage forming member at a side corresponding to the oxidation gas introducing passage to an end of the second gas passage forming member at another side corresponding to the fuel gas discharging passage.

3. The fuel cell according to claim 1, wherein a water drainage promoting member formed by a porous body having continuous pores is received in a portion of the second gas passage forming member in which the oxidation gas discharging passage and the water passage are joined together, and any one of the following configurations is selected: a configuration in which the average pore diameter of the continuous pores of the water drainage promoting member is set to a value smaller than the depth of the water passage; a configuration in which wettability of the continuous pores of the water drainage promoting member is set to a value higher than wettability of the water passage; and a configuration in which hydration property of the continuous pores of the water drainage promoting member is set to a value greater than hydration property of the water passage.

4. The fuel cell according to claim 1,
wherein the second gas passage forming member is configured by the flat plate, first projections that are formed on the flat plate to form the second gas passage, and second projections that are formed on the flat plate to form the water passage,
the first projections are shaped by cutting and raising toward the second electrode catalyst layer in such a manner that the first projections are arranged separately from one another at a plurality of positions on the flat plate material,
the second projections project toward the second separator and are shaped through extrusion in such a manner that the second projections are arranged separately from one another at a plurality of positions on the flat plate material, and
the communication holes are holes formed in the flat plate by the cutting and raising of the first projections.

5. The fuel cell according to claim 4,
wherein the first projections are shaped like bridges,
the communication holes are each formed in such a manner as to extend through the corresponding first projection in a direction perpendicular to a gas flow direction and have openings at two positions, which are a left end and a right end of the first projection as viewed in the gas flow direction,
each pair of the first projections are adjacent to each other in the direction perpendicular to the gas flow direction and, in the pair of the first projections, the first projection located upstream in the gas flow direction has a downstream end adjacent to an upstream end of the first projection located downstream in the gas flow direction, and
the second projections are arranged adjacent to the corresponding first projections from a downstream side of the gas flow direction.

6. The fuel cell according to claim 4,
wherein the first projections and the second projections are arranged alternately in the direction perpendicular to the gas flow direction and configure a plurality of row-like projection groups,
the projection groups are arranged parallel to one another and spaced apart at predetermined intervals in the gas flow direction,
a band-like flat plate portion is formed between each adjacent pair of the rows of the projection groups with the water passage formed between the flat plate portions and the second separator, and
the communication holes are each formed in such a manner as to have an opening facing upstream in the gas flow direction in the corresponding first projection.

7. The fuel cell according to claim 1,
wherein the second gas passage forming member is configured by the flat plate and first projections that are formed on the flat plate to form the second gas passage,
the first projections are shaped by cutting and raising toward the second electrode catalyst layer in such a manner that the first projections are arranged separately from one another at a plurality of positions on the flat plate material,
the second separator includes second projections projecting toward the flat plate to form the water passage between the second separator and the flat plate, the second projections being shaped through extrusion in such a manner that the second projections are arranged separately from one another at a plurality of positions on the second separator, and the communication holes are holes formed in the flat plate by the cutting and raising of the first projections.

8. The fuel cell according to claim 4, wherein the first projections are each formed in a semi-cylindrical shape in such a manner that the corresponding communication hole has a semi-circular shape as viewed in a direction perpendicular to a gas flow direction.

9. The fuel cell according to claim 4, wherein the first projections include two types, which are semi-cylindrical projections and flat table-like projections, the two types of projections being arranged alternately and separately from one another, a surface of each of the flat table-like projections held in contact with the second electrode catalyst layer is a flat surface, and a surface of each of the semi-cylindrical projections held in contact with the second electrode catalyst layer is an arcuate surface.

10. The fuel cell according to claim 1,
wherein the second gas passage forming member is configured by the flat plate, first raised portions that are formed on the flat plate and serve as the projections for forming the water passage and the second gas passage, and second raised portions that are formed on the flat plate and serve as the projections for forming the second gas passage, the first raised portions are shaped through extrusion toward the second electrode catalyst layer in such a manner that the first raised portions are arranged separately from one another at a plurality of positions on the flat plate material, the second projections are shaped through extrusion toward the second separator in such a manner that the second projections are arranged separately from one another at a plurality of positions on the flat plate material, the first raised portions and the second raised portions are formed alternately at predetermined pitches in a direction perpendicular to a gas flow direction, thereby configuring raised portion groups extending in the direction perpendicular to the gas flow direction, the communication holes are each formed by the cutting and raising of the corresponding pair of the raised portions that are adjacent to each other in the gas flow direction a flat surface portion is formed on the top of each of the first and second raised portions, and among the flat surface portions, the flat surface portion of each first raised portion corresponding to the second separator has a protuberance that contacts the second separator to form the water passage between the flat surface portion and the second separator.

11. The fuel cell according to claim 4, wherein the first projections or the first raised portions are aligned in such a manner that the second gas passage includes two types, which are straight passage portions and serpentine passage portions.

12. The fuel cell according to claim 1, wherein a water passage similar to said water passage is formed between the first gas passage forming member and the first separator, the first gas passage forming member being configured in the same manner as the second gas passage forming member.

13. The fuel cell according to claim 1, wherein the depth of the water passage is set in the range of 10 to 50 μm, and the first gas passage or the second gas passage has a depth set to 30 to 1000 μm.

14. The fuel cell according to claim 1, wherein a downstream opening of the water passage is extended to a position corresponding to a gas discharging passage, and a constriction being formed in the portion of the discharging passage corresponding to the opening in such a manner as to increase the flow velocity of gas.

15. The fuel cell according to claim 1, wherein a gas passage is formed in the flat plate of the gas passage forming member and the separator in such a manner that the gas passage corresponds to a downstream side of the water passage and extends through the flat plate and the separator, the gas passage being a constriction for increasing the flow velocity gas.

16. A fuel cell comprising:
a first electrode catalyst layer laid on an anode side surface of an electrolyte membrane;
a second electrode catalyst layer laid on a cathode side surface of the electrolyte membrane;
a first gas passage forming member that is laid on a surface of the first electrode catalyst layer and has a first gas passage for supplying fuel gas;
a second gas passage forming member that is laid on a surface of the second electrode catalyst layer and has a second gas passage for supplying oxidization gas;
a first separator laid on a surface of the first gas passage forming member;
a second separator arranged in the second gas passage forming member;
an introducing passage and a discharging passage for the fuel gas; and
an introducing passage and a discharging passage for the oxidization gas,
wherein the first gas passage forming member is configured by a flat plate, a plurality of first projections that are formed on the flat plate to form the first gas passage, and a plurality of second projections that are formed on the flat plate to form the water passage, and the first projections and the second projections project toward the opposite sides of the first gas passage forming member,
a water passage is formed between a surface of the flat plate of the first gas passage forming member and a backside of the first separator corresponding to the first gas passage forming member,
the water passage and the first gas passage are formed on the opposite sides of the first gas passage forming member and communicate with each other through a communication hole formed by each of the first projections that are shaped by cutting and raising in the first gas passage forming member,
the water passage has a depth set to a value smaller than depth of the first gas passage, and
water drawn from the first gas passage into the water passage through capillary action via the communication holes is drained to the fuel gas discharging passage by pressure caused by the fuel gas flowing in the first gas passage.

17. The fuel cell according to claim 16, wherein the water passage extends continuously along the entire range from an end of the first gas passage forming member at the side corresponding to the fuel gas introducing passage to an end of the first gas passage forming member at the side corresponding to the fuel gas discharging passage.

18. The fuel cell according to claim 16, wherein a water drainage promoting member formed by a porous body having continuous pores is received in a portion of the first gas passage forming member in which the fuel gas discharging passage and the water passage are joined together, and any one of the following configurations is selected: a configuration in which the average pore diameter of the continuous pores of the water drainage promoting member is set to a value smaller than the depth of the water passage; a configuration in which wettability of the continuous pores of the water drainage promoting member is set to a value higher than wettability of the water passage; and a configuration in which hydration property of the continuous pores of the water drainage promoting member is set to a value greater than hydration property of the water passage.

19. The fuel cell according to claim 16,
wherein the first gas passage forming member is configured by the flat plate, first projections that are formed on the flat plate to form the first gas passage, and second projections that are formed on the flat plate to form the water passage,
the first projections are shaped by cutting and raising toward the first electrode catalyst layer in such a manner that the first projections are arranged separately from one another at a plurality of positions on the flat plate material,
the second projections project toward the first separator and are shaped through extrusion in such a manner that the second projections are arranged separately from one another at a plurality of positions on the flat plate material, and
the communication holes are holes formed in the flat plate by the cutting and raising of the first projections.

20. The fuel cell according to claim 17,
wherein the first projections are shaped like bridges,
the communication holes are each formed in such a manner as to extend through the corresponding first projection in a direction perpendicular to a gas flow direction and have openings at two positions, which are a left end and a right end of the first projection as viewed in the gas flow direction,
each pair of the first projections are adjacent to each other in the direction perpendicular to the gas flow direction and, in the pair of the first projections, the first projection located upstream in the gas flow direction has a downstream end adjacent to an upstream end of the first projection located downstream in the gas flow direction, and
the second projections are arranged adjacent to the corresponding first projections from a downstream side of the gas flow direction.

21. The fuel cell according to claim 19,
wherein the first projections and the second projections are arranged alternately in the direction perpendicular to the gas flow direction and configure a plurality of row-like projection groups,
the projection groups are arranged parallel to one another and spaced apart at predetermined intervals in the gas flow direction,
a band-like flat plate portion is formed between each adjacent pair of the rows of the projection groups with the water passage formed between the flat plate portions and the first separator, and
the communication holes are each formed in such a manner as to have an opening facing upstream in the gas flow direction in the corresponding first projection.

22. The fuel cell according to claim 19,
wherein the first gas passage forming member is configured by the flat plate and first projections that are formed on the flat plate to form the first gas passage,
the first projections are shaped by cutting and raising toward the first electrode catalyst layer in such a manner that the first projections are arranged separately from one another at a plurality of positions on the flat plate material,
the first separator has second projections that are shaped through extrusion in such a manner that the second projections project toward the flat plate and are arranged separately from one another at a plurality of positions on the first separator, and
the communication holes are holes formed in the flat plate by the cutting and raising of the first projections.

23. The fuel cell according to claim 19, wherein the first projections are each formed in a semi-cylindrical shape in such a manner that the corresponding communication hole has a semi-circular shape as viewed in a direction perpendicular to a gas flow direction.

24. The fuel cell according to claim 19, wherein the first projections include two types, which are semi-cylindrical projections and flat table-like projections, the two types of projections being arranged alternately and separately from one another, a surface of each of the flat table-like projections held in contact with the second electrode catalyst layer is a flat surface, and a surface of each of the semi-cylindrical projections held in contact with the second electrode catalyst layer is an arcuate surface.

25. The fuel cell according to claim 16,
wherein the first gas passage forming member is configured by the flat plate, first raised portions that are formed on the flat plate and serve as the projections for forming the water passage and the first gas passage, and second raised portions that are formed on the flat plate and serve as the projections for forming the second gas passage,
the first raised portions are shaped through extrusion toward the first electrode catalyst layer in such a manner that the first raised portions are arranged separately from one another at a plurality of positions on the flat plate material,
the second projections are shaped through extrusion toward the first separator in such a manner that the second projections are arranged separately from one another at a plurality of positions on the flat plate material,
the first raised portions and the second raised portions are formed alternately at predetermined pitches in a direction perpendicular to a gas flow direction, thereby configuring raised portion groups extending in a direction perpendicular to the gas flow direction,
the communication holes are each formed by the cutting and raising of the corresponding pair of the raised portions that are adjacent to each other in the gas flow direction,
a flat surface portion is formed on the top of each of the first and second raised portions, and
among the flat surface portions, the flat surface portion of each first raised portion corresponding to the first separator has a protuberance that contacts the first separator to form the water passage between the flat surface portion and the first separator.

26. The fuel cell according to claim 19, wherein the first projections or the first raised portions are aligned in such a manner that the second gas passage includes two types, which are straight passage portions and serpentine passage portions.

27. The fuel cell according to claim 16, wherein the depth of the water passage is set in the range of 10 to 50 μm, and the depth of the first gas passage is set to 30 to 1000 μm.

28. The fuel cell according to claim 16, wherein a downstream opening of the water passage is extended to a position corresponding to a gas discharging passage, the cross-sectional area of the discharging passage corresponding to the opening being set to such a small value that the flow velocity of gas increases.

29. The fuel cell according to claim 16, wherein a water drainage passage is formed in the flat plate of the gas passage forming member and the separator and extends in a direction perpendicular to the flat plate and the separator, the cross-sectional area of the water drainage passage being set to such a small value that the flow velocity of gas increases.

* * * * *

UNITED STATES PATENT AND TRADEMARK OFFICE
CERTIFICATE OF CORRECTION

PATENT NO. : 9,160,020 B2
APPLICATION NO. : 13/259495
DATED : October 13, 2015
INVENTOR(S) : Kawajiri et al.

It is certified that error appears in the above-identified patent and that said Letters Patent is hereby corrected as shown below:

On the Title page, in item (73), in "Assignee", in column 1, line 2, delete "Toyota Jidosha Kabushiki Kiasha" and insert --Toyota Jidosha Kabushiki Kaisha--, therefor Signed and Sealed this
Sixteenth Day of February, 2016

Michelle K. Lee
*Director of the United States Patent and Trademark Office*